(12) United States Patent
Steinhauser et al.

(10) Patent No.: US 7,626,146 B2
(45) Date of Patent: Dec. 1, 2009

(54) MODULAR HEATER SYSTEMS

(75) Inventors: Louis P. Steinhauser, St. Louis, MO (US); Christopher C. Lanham, O'Fallon, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 602 days.

(21) Appl. No.: 11/199,832

(22) Filed: Aug. 9, 2005

(65) Prior Publication Data

US 2007/0045275 A1 Mar. 1, 2007

(51) Int. Cl.
*H05B 3/08* (2006.01)
*H05B 3/78* (2006.01)

(52) U.S. Cl. .................... 219/541; 219/549; 219/528; 219/529; 219/552; 219/553; 392/472; 392/479; 392/465; 392/466; 392/467; 392/468

(58) Field of Classification Search ................ 392/478, 392/472, 479, 465–8; 219/549, 541, 528–9, 219/552–3, 228
See application file for complete search history.

(56) References Cited

U.S. PATENT DOCUMENTS

| | | | |
|---|---|---|---|
| 1,674,488 A * | 6/1928 | Tang ..................... 338/207 |
| 3,955,601 A | 5/1976 | Plummer, III |
| 3,971,416 A | 7/1976 | Johnson |
| RE29,332 E | 8/1977 | Bilbro et al. |
| 4,123,837 A | 11/1978 | Horner |
| 4,152,577 A | 5/1979 | Leavines |
| 4,254,326 A | 3/1981 | Walker et al. |
| 4,281,238 A * | 7/1981 | Noma et al. ............ 219/535 |
| 4,429,213 A | 1/1984 | Mathieu |
| 4,638,150 A | 1/1987 | Whitney |
| 4,791,277 A | 12/1988 | Montierth et al. |
| 4,849,611 A | 7/1989 | Whitney et al. |
| 5,086,836 A | 2/1992 | Barth et al. |
| 5,294,780 A | 3/1994 | Montierth et al. |
| 5,390,961 A | 2/1995 | Guthrie |
| 5,537,742 A * | 7/1996 | Le et al. ............... 29/869 |
| 5,632,919 A | 5/1997 | MacCracken et al. |
| 5,714,738 A | 2/1998 | Hauschulz et al. |
| 5,864,941 A | 2/1999 | Baichoo et al. |

(Continued)

FOREIGN PATENT DOCUMENTS

DE    35 44 589    6/1987

(Continued)

*Primary Examiner*—Shawntina Fuqua
(74) *Attorney, Agent, or Firm*—Brinks Hofer Gilson & Lione

(57) ABSTRACT

A heat trace assembly for heating a conduit is provided that comprises at least one preformed heat trace section adapted to be placed around at least a portion of the conduit and a connector secured to the heat trace section. The connector is adapted for coupling the heat trace section to an adjacent heat trace section, and the heat trace section and the connector have mating mechanical features to allow the heat trace section to be quickly connected to and disconnected from the conduit. Additionally, a heat trace junction is provided that preferably defines a cross configuration and comprises a plurality of arms extending from a central portion of the heat trace junction. The plurality of arms are deformable to conform to a junction within a conduit system. Thermal insulation jacket configurations are also provided in accordance with several embodiments of the present invention.

21 Claims, 30 Drawing Sheets

U.S. PATENT DOCUMENTS

| | | |
|---|---|---|
| 5,933,574 A | 8/1999 | Avansino |
| 6,498,898 B2 | 12/2002 | Schmitt |
| 6,727,481 B1 | 4/2004 | Wilds |
| 6,792,200 B2 | 9/2004 | Hersh |
| 6,839,508 B2 | 1/2005 | Biess et al. |

FOREIGN PATENT DOCUMENTS

| | | |
|---|---|---|
| DE | 20 2005 004602 | 7/2005 |
| EP | 0 937 565 | 8/1999 |
| FR | 2 576 662 | 8/1986 |
| FR | 2 599 115 | 11/1987 |
| JP | 8 326983 | 12/1996 |
| WO | WO 90/10817 | 9/1990 |
| WO | WO 97/03540 | 1/1997 |
| WO | WO 01/56731 | 8/2001 |

* cited by examiner

MODULAR HEATER SYSTEMS

FIELD OF THE INVENTION

The present invention relates generally to electric heaters for use in pipelines, and more particularly to electric heaters for use in gaslines and pumplines such as, by way of example, semiconductor processing systems.

BACKGROUND OF THE INVENTION

The supply of fluids such as oil, gas, and water, among others, from a supply, e.g., an oil well or a water reservoir, requires transfer of such fluids by conduits or the like. Maintaining a free or unrestricted flow of the fluids within the conduits is often necessary, in addition to maintaining the fluid at or above a certain temperature. Presently, an electric heater in the form of a cable or a tape, known in the art as a "heat trace," is commonly used around the conduits to provide heat to the conduits and thus to the fluids. Additionally, the conduits and the heat traces are sometimes surrounded by a thermal insulation jacket to reduce heat loss to the surrounding environment.

Heat trace cables are a popular means for heating such fluid conduits due to their relative simplicity and low cost. Generally, heat trace cables are disposed along the length of the conduits or wrapped around the conduits and are fastened at regular intervals with bands, retaining straps or any other suitable fasteners, as shown in U.S. Pat. No. 5,294,780 to Montierth et al., U.S. Pat. No. 5,086,836 to Barth et al., U.S. Pat. No. 4,791,277 to Montierth et al., U.S. Pat. No. 4,152,577 to Leavines, U.S. Pat. No. 4,123,837 to Horner, U.S. Pat. No. 3,971,416 to Johnson, and U.S. Pat. Reissue No. 29,332 to Bilbro. Fastening heat trace cables to the pipe or conduit has proven to be time consuming and burdensome, particularly for replacement of utility lines and continuous manufacturing processes, among others, where time is of the essence.

To expedite the replacement of utility lines, U.S. Pat. No. 6,792,200 proposes a pre-fabricated heat-traced pipe, wherein a pipe to be heated, a heat trace, and a connector for electrically connecting the heat trace to a power source are cured and integrally formed beforehand and inventoried before a need for replacing an old pipe arises. While this prefabricated pipe saves some time with respect to replacement of utility lines, it requires a custom-made heat-traced pipe, thereby increasing undesirable inventory space and manufacturing and maintenance costs.

SUMMARY OF THE INVENTION

In one preferred form, a heat trace assembly for heating a conduit is provided that comprises at least one preformed heat trace section adapted to be placed around at least a portion of the conduit and a connector secured to the heat trace section and adapted for coupling the heat trace section to an adjacent heat trace section. The heat trace and the connector have mating mechanical features to allow the heat trace to be quickly connected to and disconnected from the conduit.

In another form, a heat trace junction is provided that preferably defines a cross configuration and comprises a plurality of arms extending from a central portion of the heat trace junction, wherein the plurality of arms are deformable to conform to a junction within a conduit system.

In yet another form, a thermal insulation jacket for a heated conduit is provided that comprises a body having an outer wall and an inner wall and a plurality of chambers, in a variety of configurations, formed between the outer wall and the inner wall.

In still another form, a thermal insulation jacket for a heated conduit is provided that comprises a body comprising a longitudinal slit and a flap disposed adjacent the longitudinal slit. The flap is placed over the longitudinal slit when the thermal insulation jacket is disposed around the heated conduit to secure the flap to the body.

Additionally, another thermal insulation jacket for a heated conduit is provided that comprises a body defining an outer wall and an inner wall, the body comprising a feature disposed along the inner wall for positioning the thermal insulation jacket relative to the heated conduit.

The features of each of the thermal insulation jackets may be provided alone or in combination with one another, and the thermal insulation jackets are preferably extruded in one form of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION OF THE PREFERRED EMBODIMENTS

The following description of the preferred embodiments is merely exemplary in nature and is in no way intended to limit the invention, its application, or uses.

The structure of a heater in accordance with the present invention is now described in greater detail. At the outset, it should be understood that the word "conduit" as used throughout this specification includes, without limitation, tubes, pipes, and other enclosed or partially enclosed members for the transfer of fluids or other materials such as powders or slurries. The materials carried by the conduits described herein includes solids, liquids, and gases and may include, by way of example, fluids that are transferred within a semiconductor processing apparatus. The following description of the preferred embodiments with reference to such a semiconductor processing apparatus is merely exemplary in nature and is in no way intended to limit the invention, its application, or uses. Accordingly, the teachings of the present invention are not limited to a semiconductor processing apparatus and can be applied to any system of conduits while remaining within the scope of the present invention.

Figure 1:
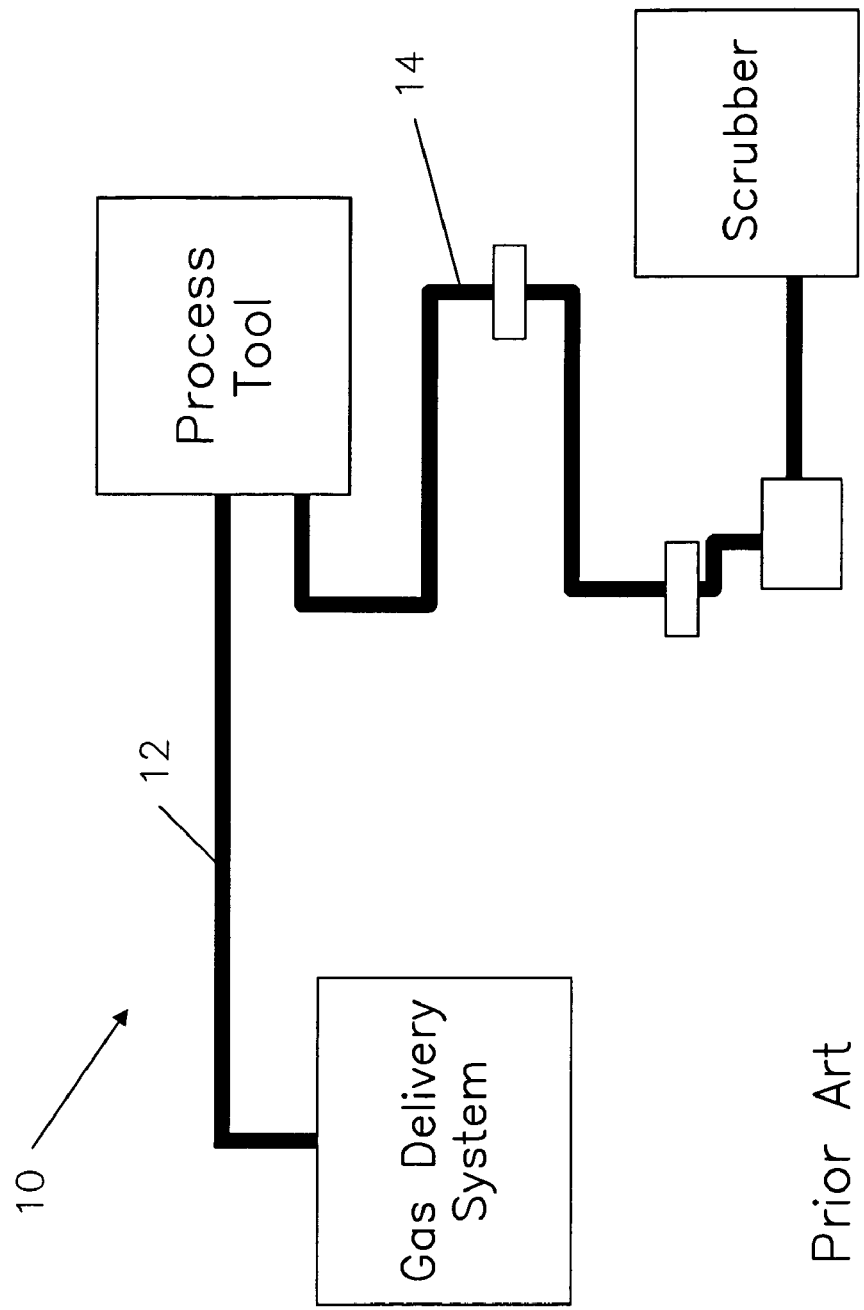
FIG. 1 is a schematic view showing one of the applications of a modular heat trace assembly to heated semiconductor gaslines and pumplines.
Figure 2:
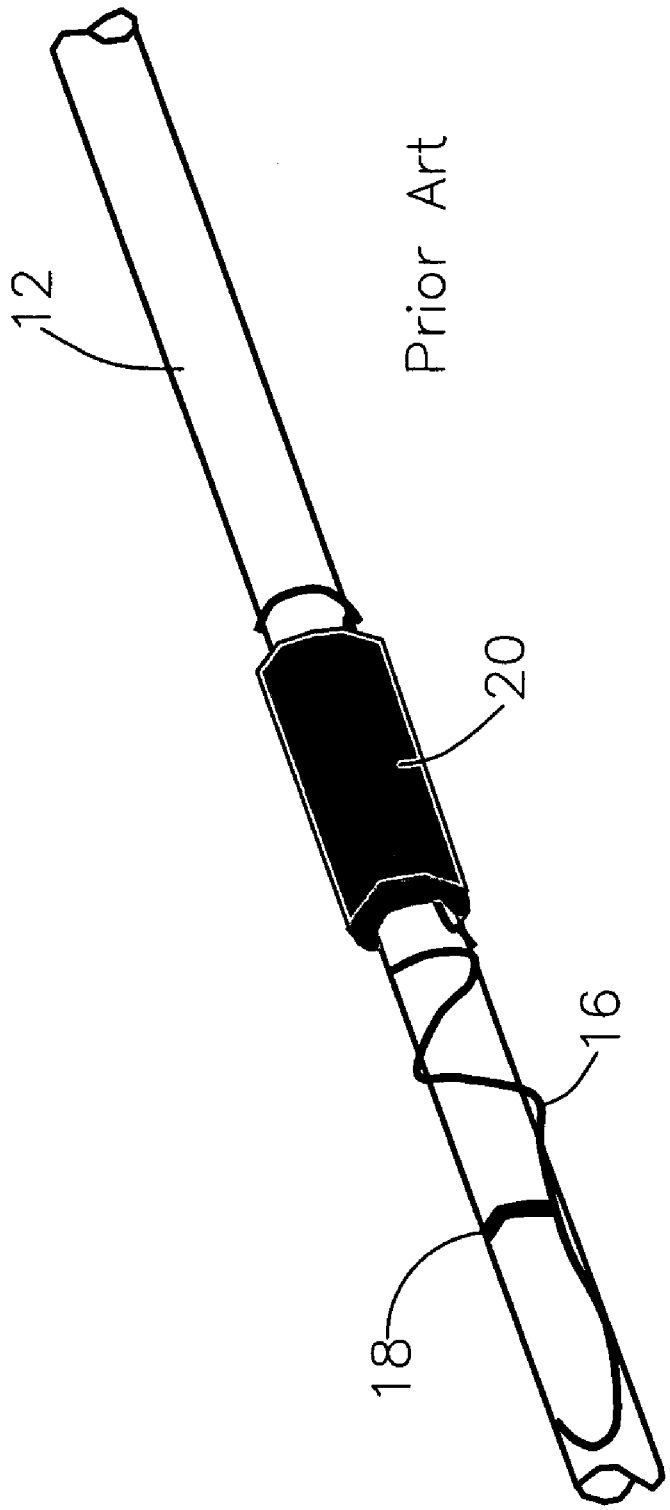
FIG. 2 is a perspective view of a prior art heat trace cable disposed around a gasline or pumpline.

Referring to FIG. 1, a semiconductor processing system 10 is illustrated, which generally includes a heated gasline 12 that extends from a remote gas delivery system to a process tool, and a heated pumpline 14 that extends from the process tool, through a plurality of components as shown, and to a scrubber. During operation, both the gasline 12 and the pumpline 14 must be heated according to specific processing requirements, which has typically been accomplished with heat trace cables 16 as shown in FIG. 2. The heat trace cables 16 are placed or wrapped along the length of the gasline 12 or pumpline 14 as shown, and are secured to the gasline 12 or pumpline 14 using a glass tape 18 or other securing means. Additionally, insulation 20 is often placed around the heat trace cables 16 to reduce heat loss to the outside environment. The insulation 20 is typically wrapped around the heat trace cables 16 and secured in place by separate pieces of tape or ties around the gasline 12 or pumpline 14.

Figure 3:
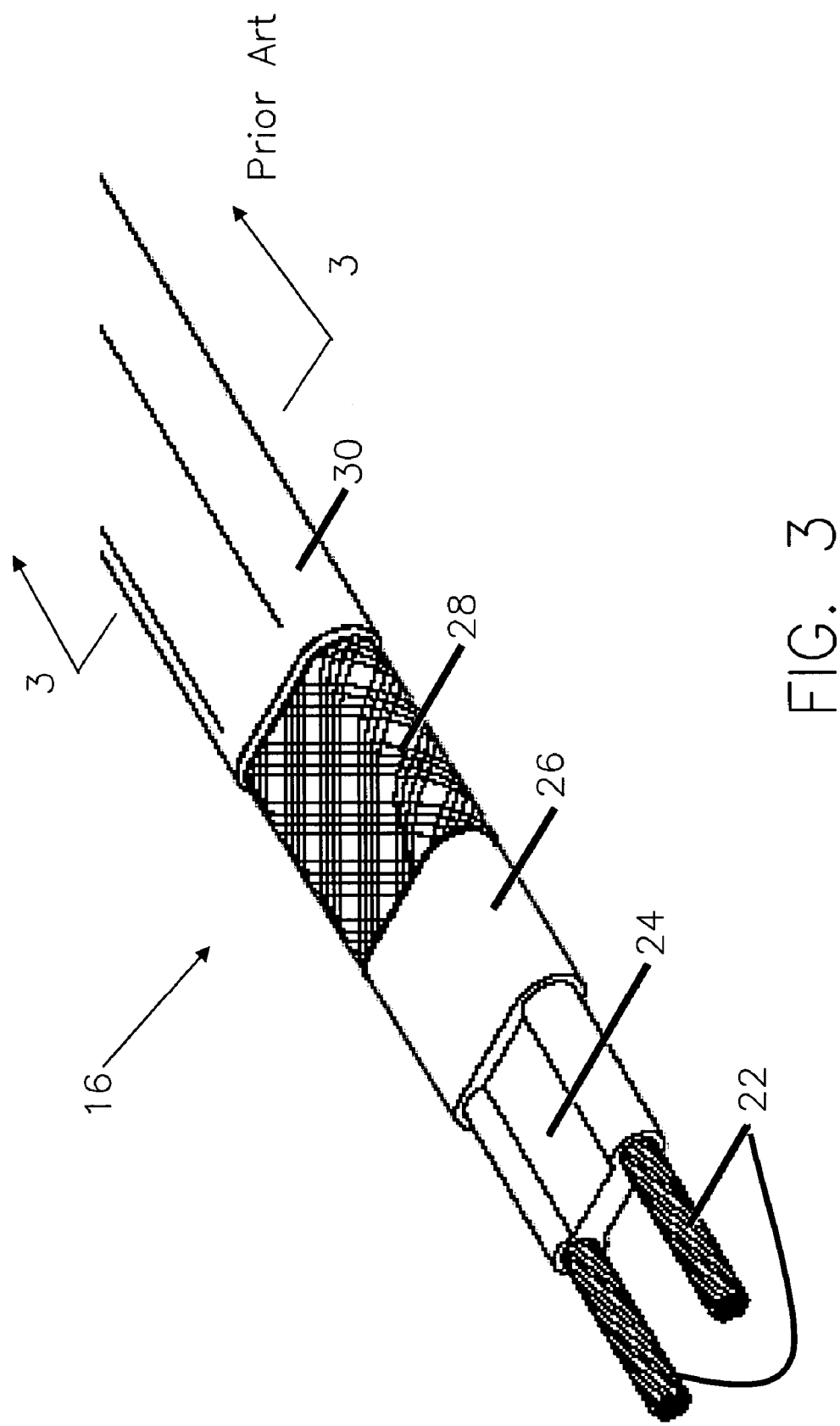
FIG. 3 is a perspective cutaway view of a prior art heat trace cable.
Figure 4:
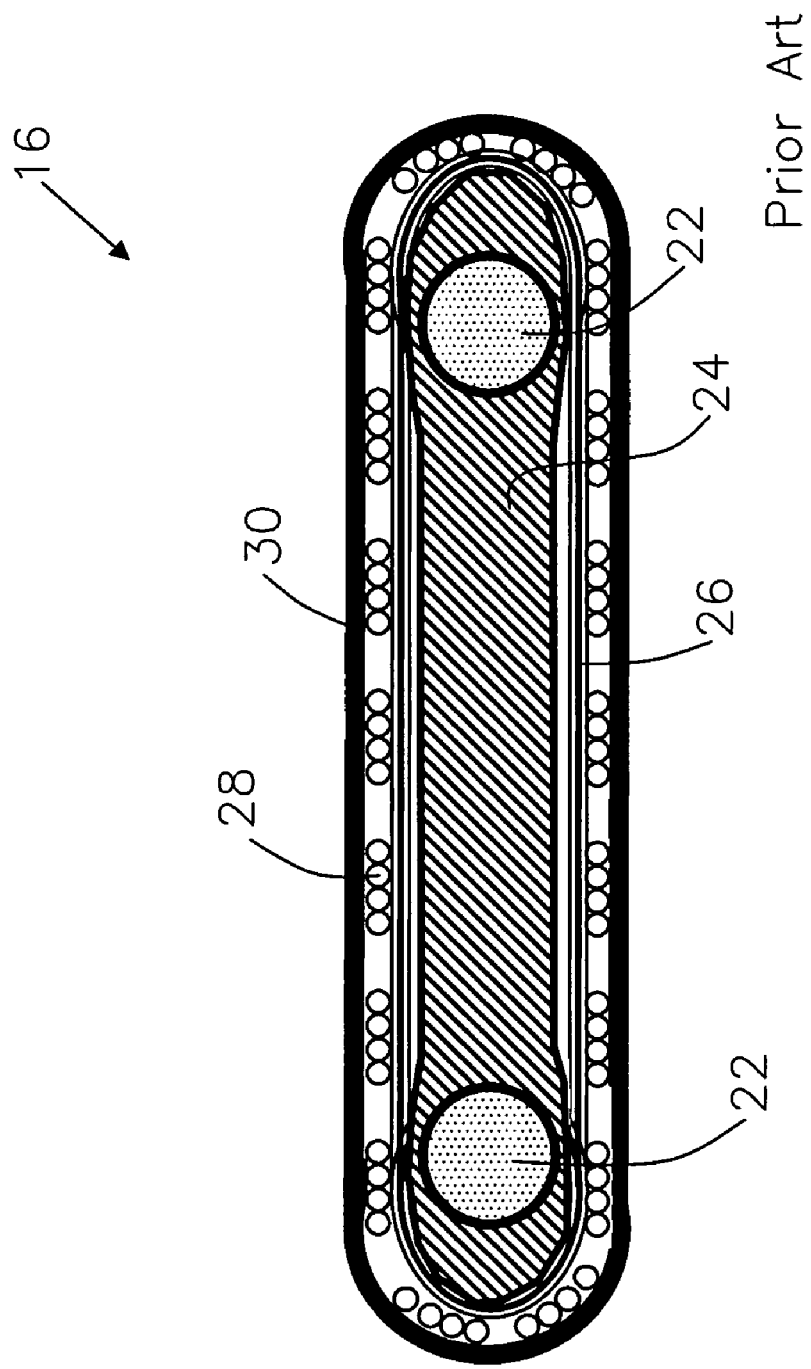
FIG. 4 is a cross-sectional view, taken along line 3-3, of the prior art heat trace cable of FIG. 3.

Referring to FIGS. 3 and 4, the construction and materials of the heat trace cables 16 are illustrated and described in greater detail. The heat trace cable 16 typically includes a pair of bus-conductors 22, which are surrounded by a semiconductive polymer material 24 that functions as a heating element. A dielectric or insulator material 26 surrounds the semiconductive polymer material 24, which may optionally be surrounded by a metal braid material 28 as shown for additional functionality such as a ground plane. Further, an outer jacket 30 surrounds the metal braid material 28 to protect the overall assembly, and the outer jacket 30 is typically an insulating material such as a thermoplastic.

Although relatively lower cost than other heater systems, heat trace cables 16 must be cut to length in the field and spliced into an appropriate connector or terminal, which is often time consuming and cumbersome. Additionally, heat trace cables 16 are not as capable as other heating systems in providing a relatively uniform heating profile along the length of a conduit due to the limited area of coverage and the relatively crude means by which they are secured to the conduit. Heat trace cables 16 provide only casual contact with the conduit due to their stiffness and difficulty in forming to the shape of the conduit.

With reference now to FIGS. 5 through 8, a modular heat trace assembly adapted for use in a semiconductor processing system 10 in accordance with a first embodiment of the present invention is illustrated and generally indicated by reference numeral 50. The modular heat trace assembly 50 comprises heat trace sections 52 for contacting and heating a conduit 13 of the semiconductor processing system 10. The modular heat trace assembly 50 also comprises connectors 54 for securing adjacent heat trace sections 52 and for securing the modular heat trace assembly 50 to components of the semiconductor processing system 10 as described in greater detail below.

The heat trace sections 52 are preferably formed as an elongated shape as shown and include a curved portion 56 and a pair of opposing locking edges 58 extending in a longitudinal direction of the curved portion 56. The curved portion 56 has an inner surface 60 defining an open channel 62 for placement around the conduit 13. The inner surface 60 is preferably complementary to an outer surface of the conduit 13 to allow for securing the heat trace section 52 to the conduit 13. The curved portion 56 preferably surrounds at least a half of the entire outer surface of the conduit 13 to provide more uniform heat transfer from the heat trace section 52 to the conduit 13 and to allow for self-locking of the heat trace section 52 around the conduit 13 by the locking edges 58.

As shown, the locking edges 58 are spaced apart in a direction transverse to the longitudinal axis of the curved portion 56 and are so configured as to facilitate the mounting of the heat trace sections 52 to the conduit 13. Since the heat trace material is flexible, when the channel 62 of the heat trace section 52 is placed around the conduit 13, the locking edges 58 can be deflected outwardly and are then biased against the conduit 13 when released to secure the heat trace section 52 to the conduit 13.

As further shown, a pair of conductors 64 are provided within the heat trace section 52, preferably along the locking edges 58 as shown, wherein the conductors 64 extend outwardly from opposite ends 66 and 68. The conductors 64 are configured for connection to a power source (not shown) for providing heat along the heat trace section 52. The conductors 64 are also adapted, as described in greater detail below, for connection to an adjacent heat trace section 52 or to an adjacent connector 54. Although not illustrated in FIGS. 5 through 8, it should be understood that the heat trace section 52 comprises the semiconductive polymer material, a dielectric or insulator material surrounding the semiconductive polymer material, and may also comprise optional materials for a ground plane and an outer jacket as previously described. These separate materials are not illustrated with the heat trace section 52 for purposes of clarity.

The heat trace sections 52 are preferably preformed in sizes corresponding to different sizes, or outside diameters for example, of the conduit 13. The heat trace sections 52 are also capable of being cut to length, according to a desired length for a particular section of conduit 13. Preferably, the heat trace sections 52 are provided in standard sizes and lengths for ease of repair and replacement within a conduit system such as the semiconductor processing system 10 as shown. Accordingly, the modular construction of the heater system according to the teachings of the present invention facilitates a relatively low cost heater system that is easily adapted to a conduit system.

Figure 5:
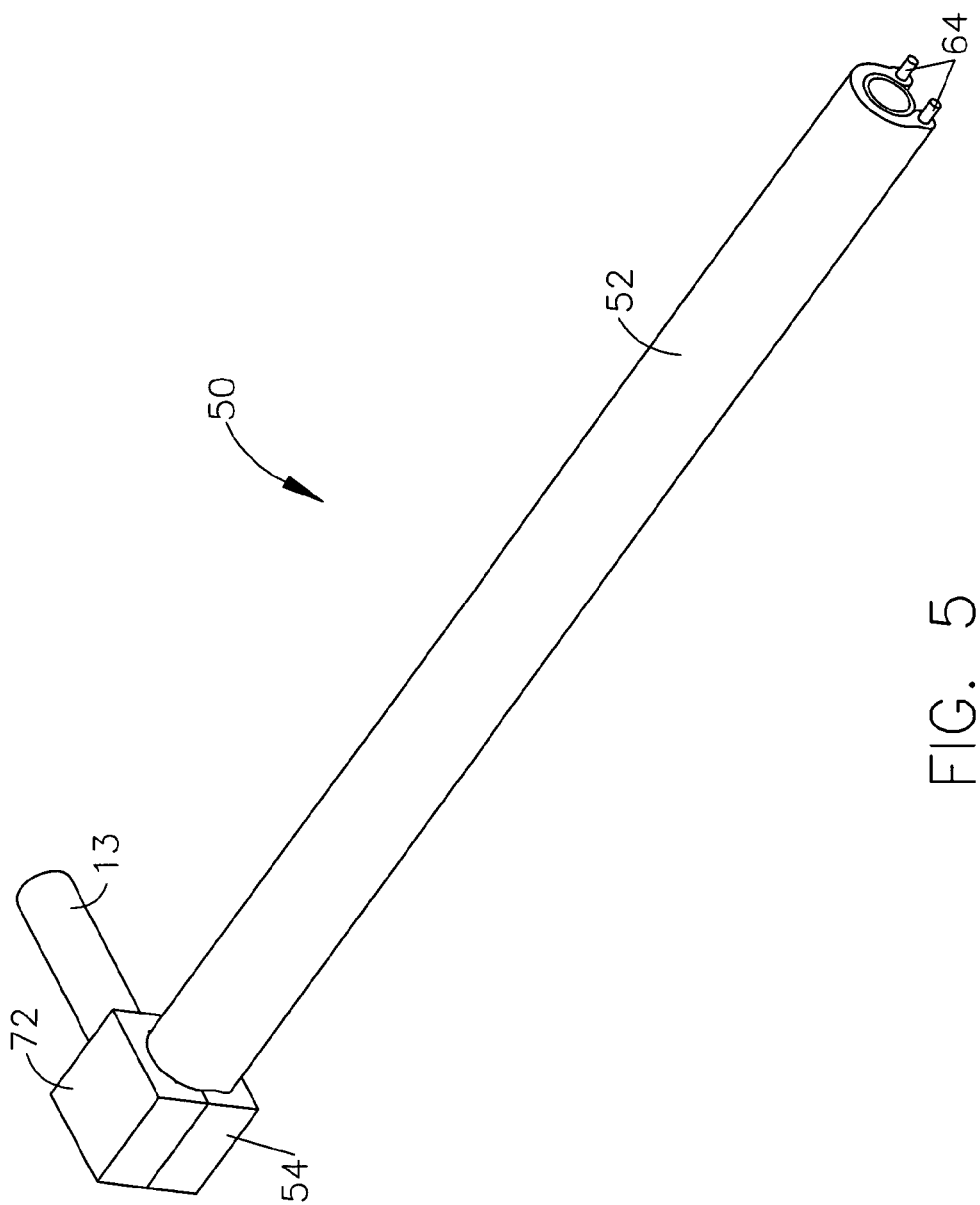
FIG. 5 is a perspective view of a modular heat trace assembly secured to a conduit system in accordance with a first embodiment of the present invention.
Figure 6:
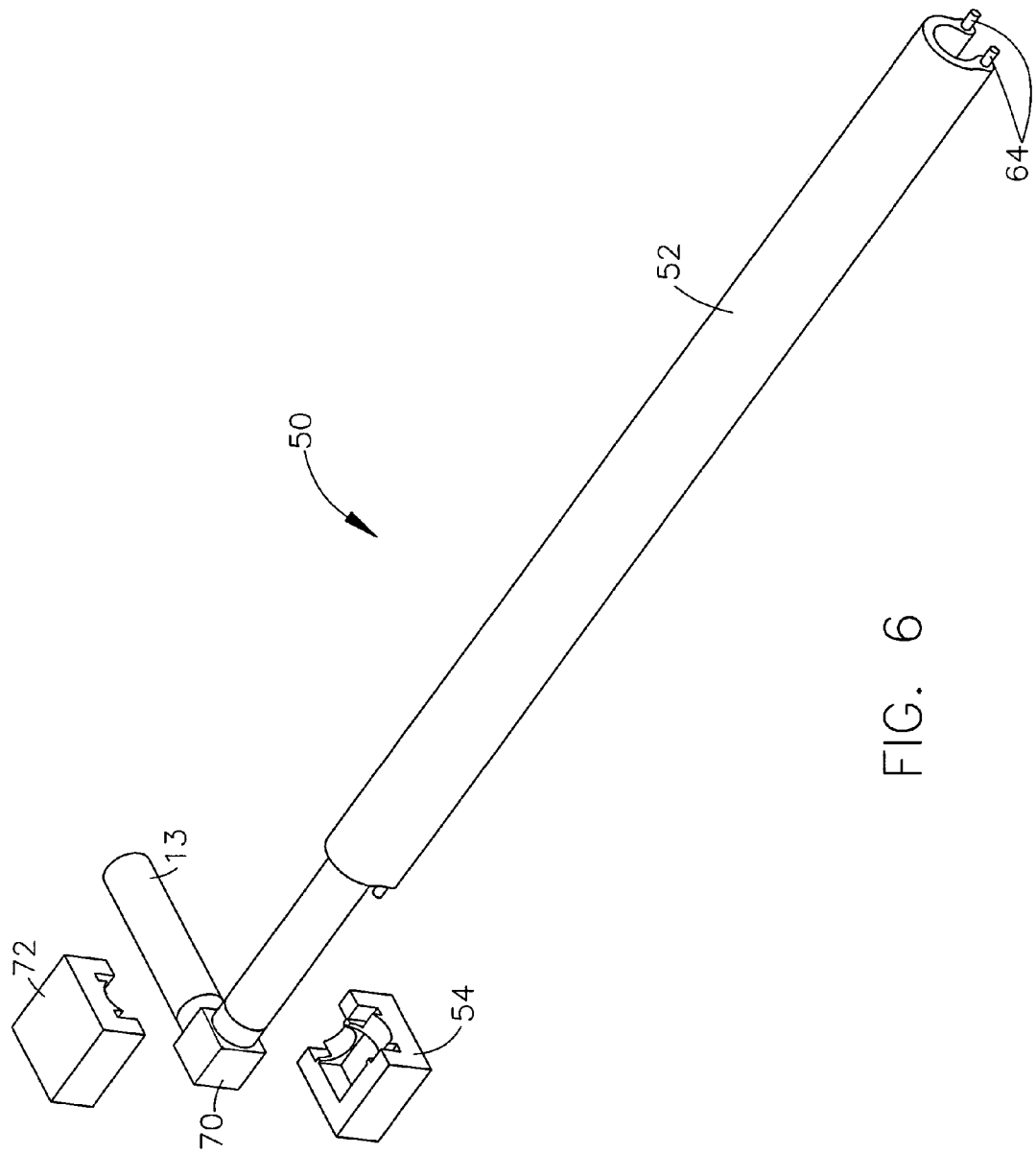
FIG. 6 is an exploded perspective view of the modular heat trace assembly of FIG. 5 in accordance with the teachings of the present invention.
Figure 7:
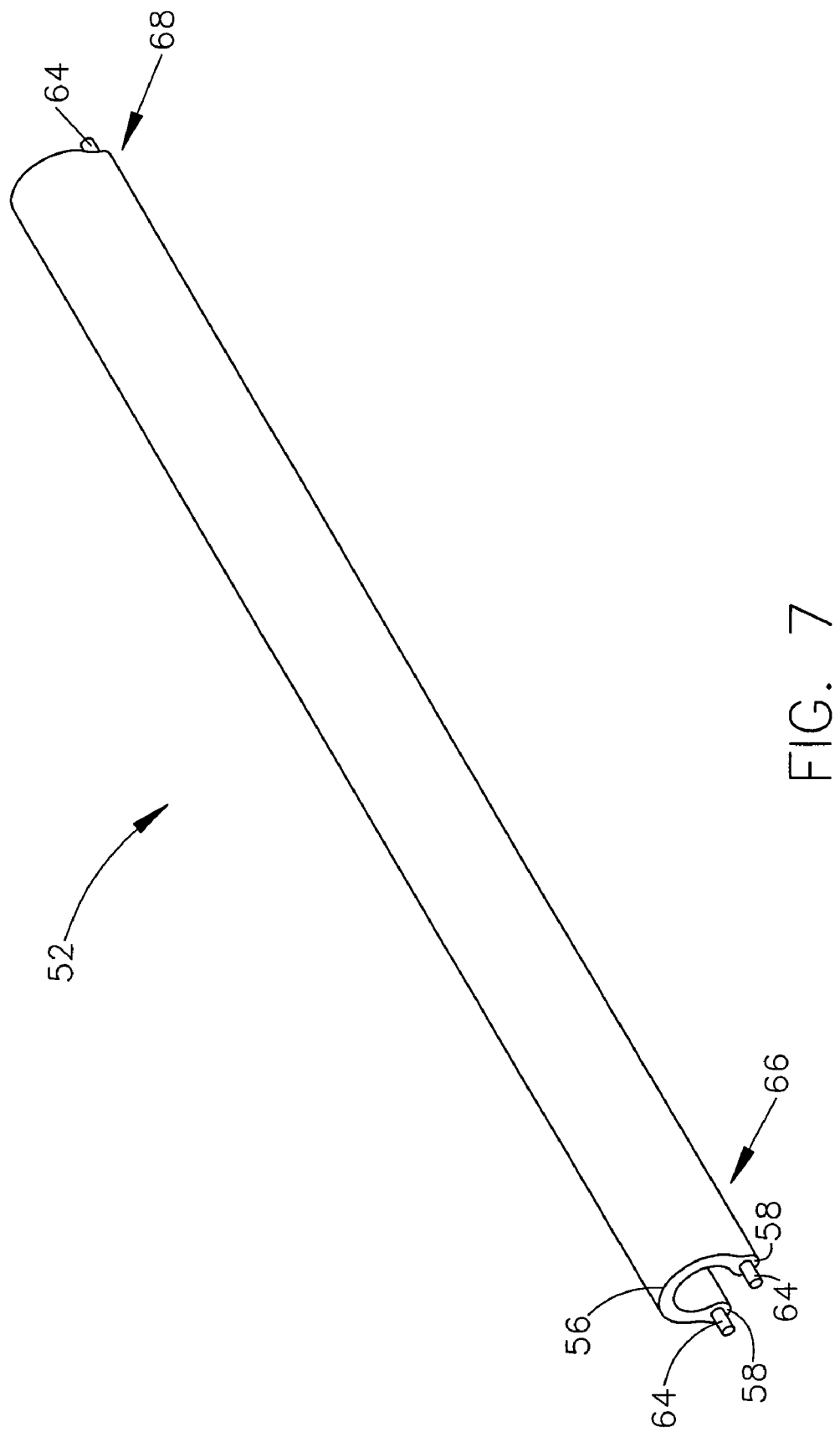
FIG. 7 is a perspective view of a heat trace section of FIGS. 5 and 6 constructed in accordance with the teachings of the present invention.
Figure 8:
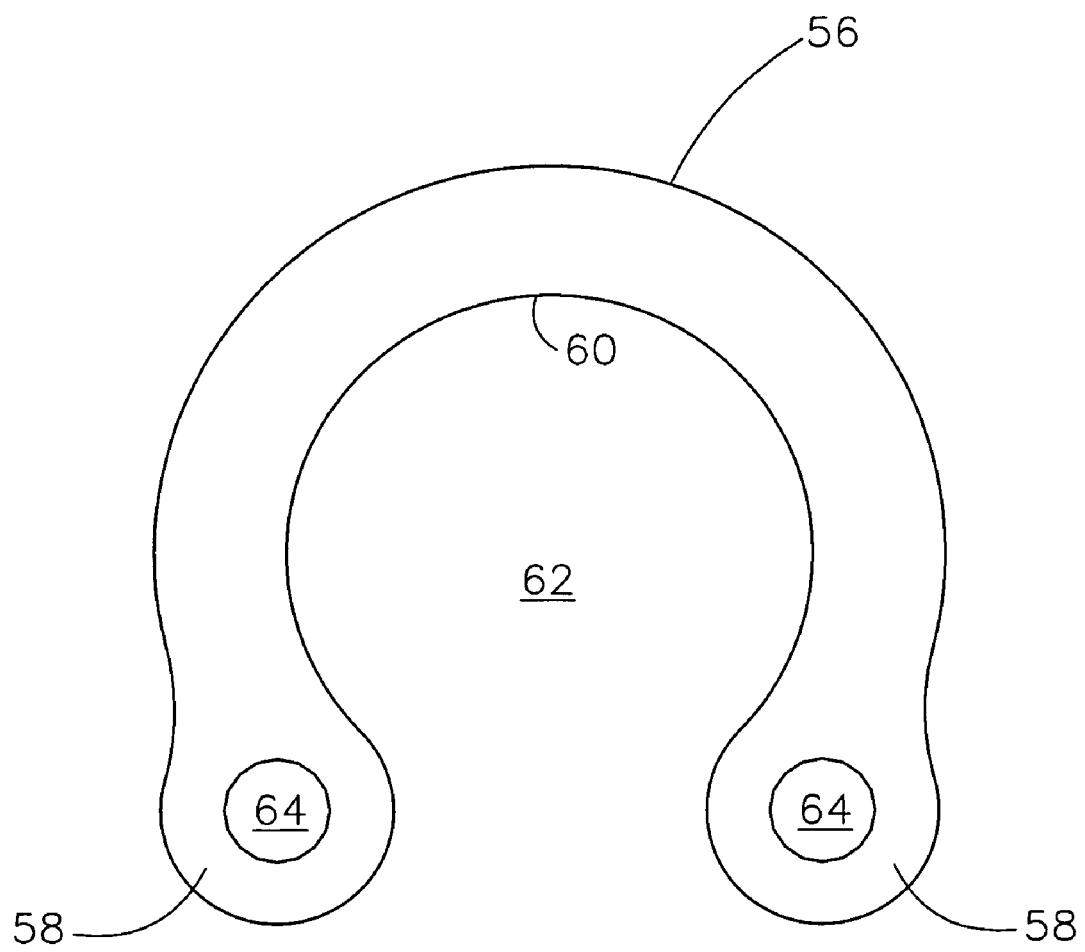
FIG. 8 is an end view of the heat trace section of FIG. 7 in accordance with the teachings of the present invention.
Figure 9:
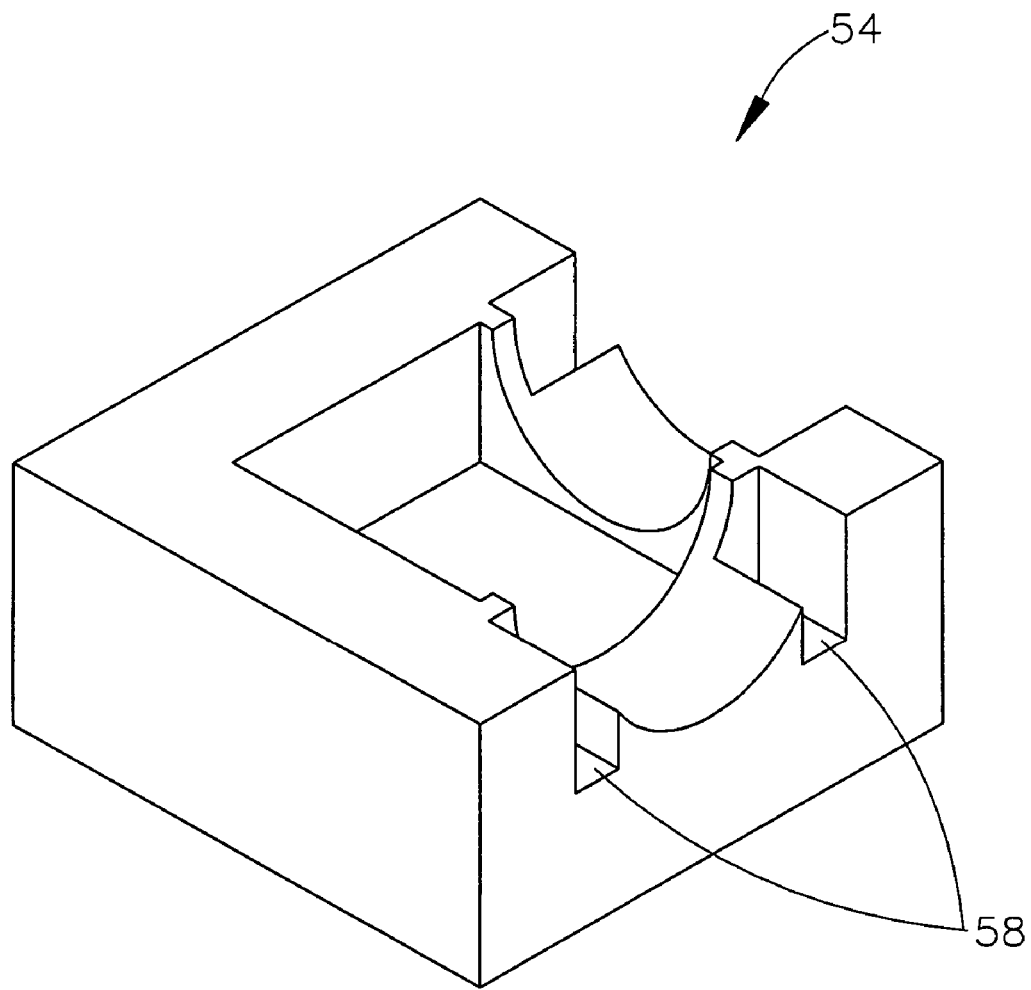
FIG. 9 is a perspective view of a connector of FIGS. 5 and 6 in accordance with the teachings of the present invention.
Figure 10:
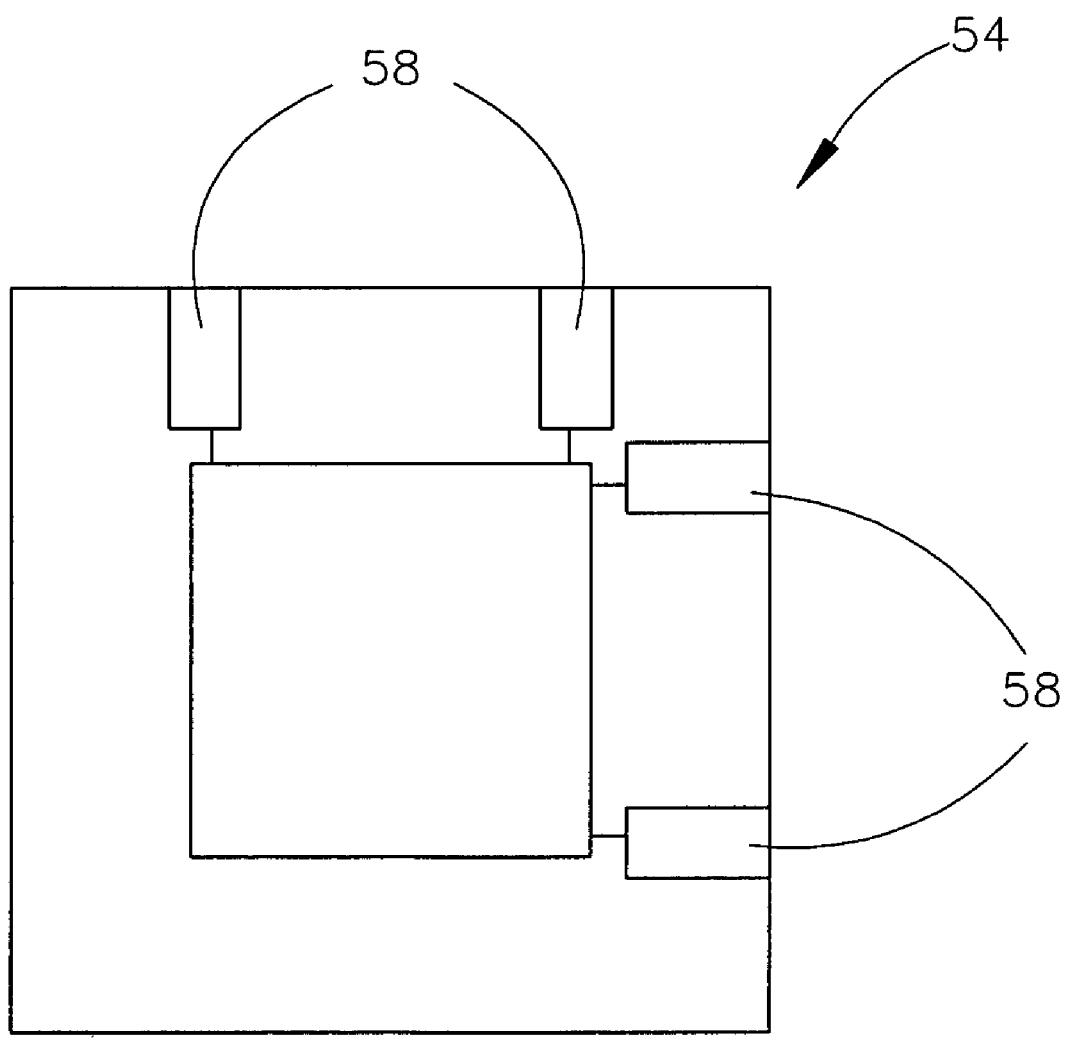
FIG. 10 is a top view of the connector of FIG. 9 in accordance with the teachings of the present invention.

Referring now to FIGS. 9 through 11c in conjunction with FIGS. 5 and 6, the connector 54 is provided proximate at least one of the opposite ends 66 or 68 of the heat trace section 52 to secure the heat trace section 52 to an adjacent heat trace section 52 between or across a fitting 70 of the conduit system 10. Preferably, the connector 54 is formed to the shape of the fitting for ease of installation and removal. Additionally, a mating cover 72 is provided to cover the connector 54 proximate the fitting, which is also formed to the shape of the fitting.

The heat trace section 52 and the connector 54 define mating features to allow for a quick engagement and disengagement between the heat trace section 52 and the connector 54. In this illustrative embodiment, the connector 54 is provided with a pair of corresponding grooves 58 for receiving the conductors 64, which are typically in the form of pins, or exposed wires a result of stripping, in a heat trace type heater, as described in greater detail below.

The connector 54 may comprise one of a plurality of forms for electrical connection and heat transfer in accordance with the teachings of the present invention. In a first form shown in FIG. 11a, the connector 54 comprises an insulative material and includes electrical connector elements 74 disposed within the grooves 58. The electrical connector elements 74 are generally in the form of a socket and are adapted to receive the conductors 64 as shown. The electrical connector elements 74 may be sized for an interference fit, or alternately, may be crimped onto the conductors 64 as necessary. Alternatively, the electrical connector elements 74 may comprise a squeeze connector, which is also known as an insulation displacement or piercing connector, that includes an electrical contact that is moved by a flexible cover or housing to contact the conductors 64 through their surrounding materials, e.g., insulating material, semiconductive polymer material metal braid material. An exemplary squeeze connector is illustrated in U.S. Pat. No. 4,861,278, and a wide variety of such connectors are commercially available from numerous sources and are not illustrated herein for purposes of brevity. Accordingly, it should be understood that a variety of electrical connectors may be employed while remaining within the scope of the present invention. It should also be understood that electrical connection between the electrical connector elements 74 across the connector 54, as indicated by the dashed line 75, may also be employed in order to provide electrical continuity across the connector 54, using a variety of electrical connection approaches while remaining within the scope of the present invention.

Figure 11A:
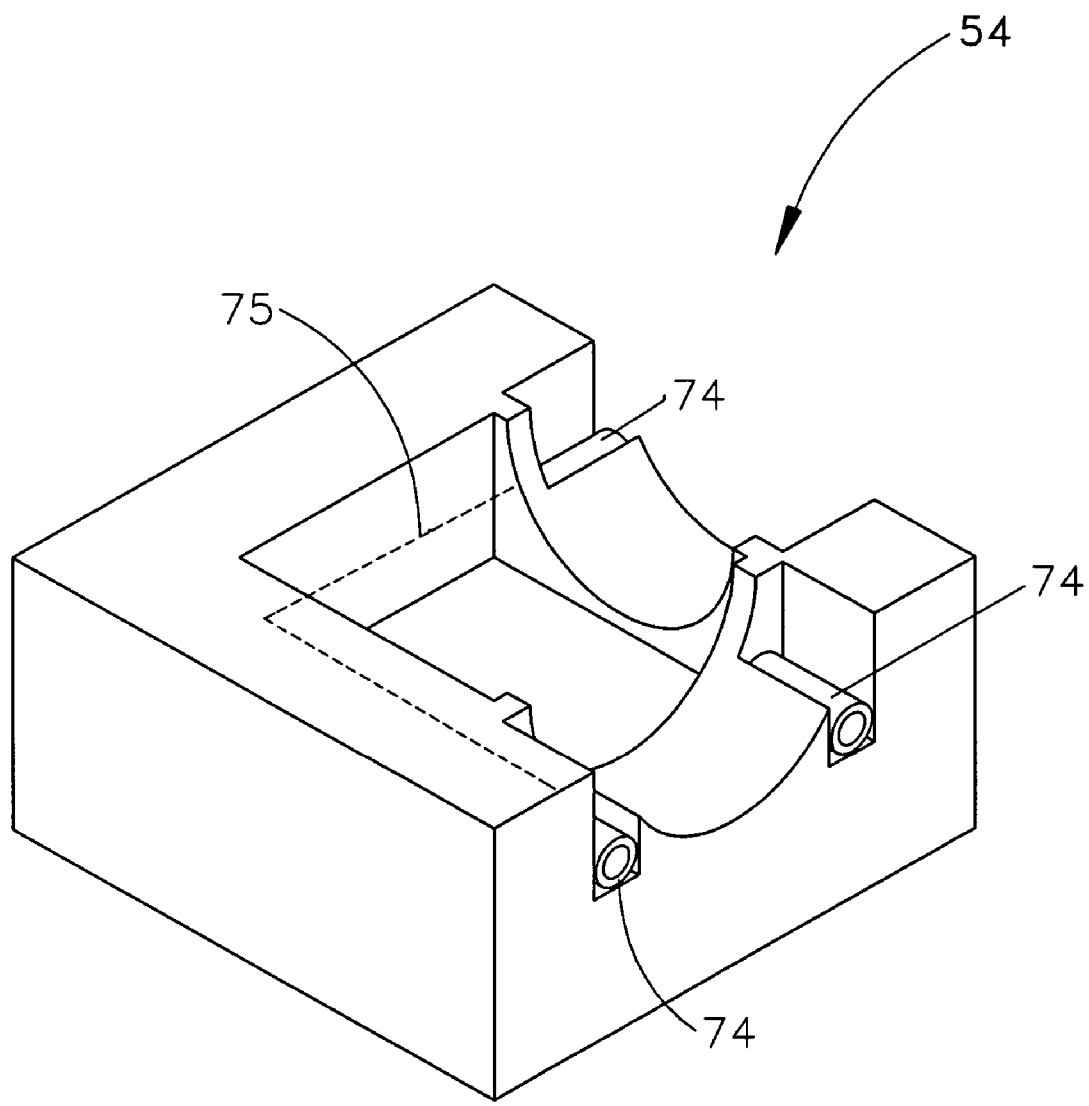
FIG. 11a is a perspective view of a connector in accordance with one embodiment constructed in accordance with the principles of the present invention.
Figure 11B:
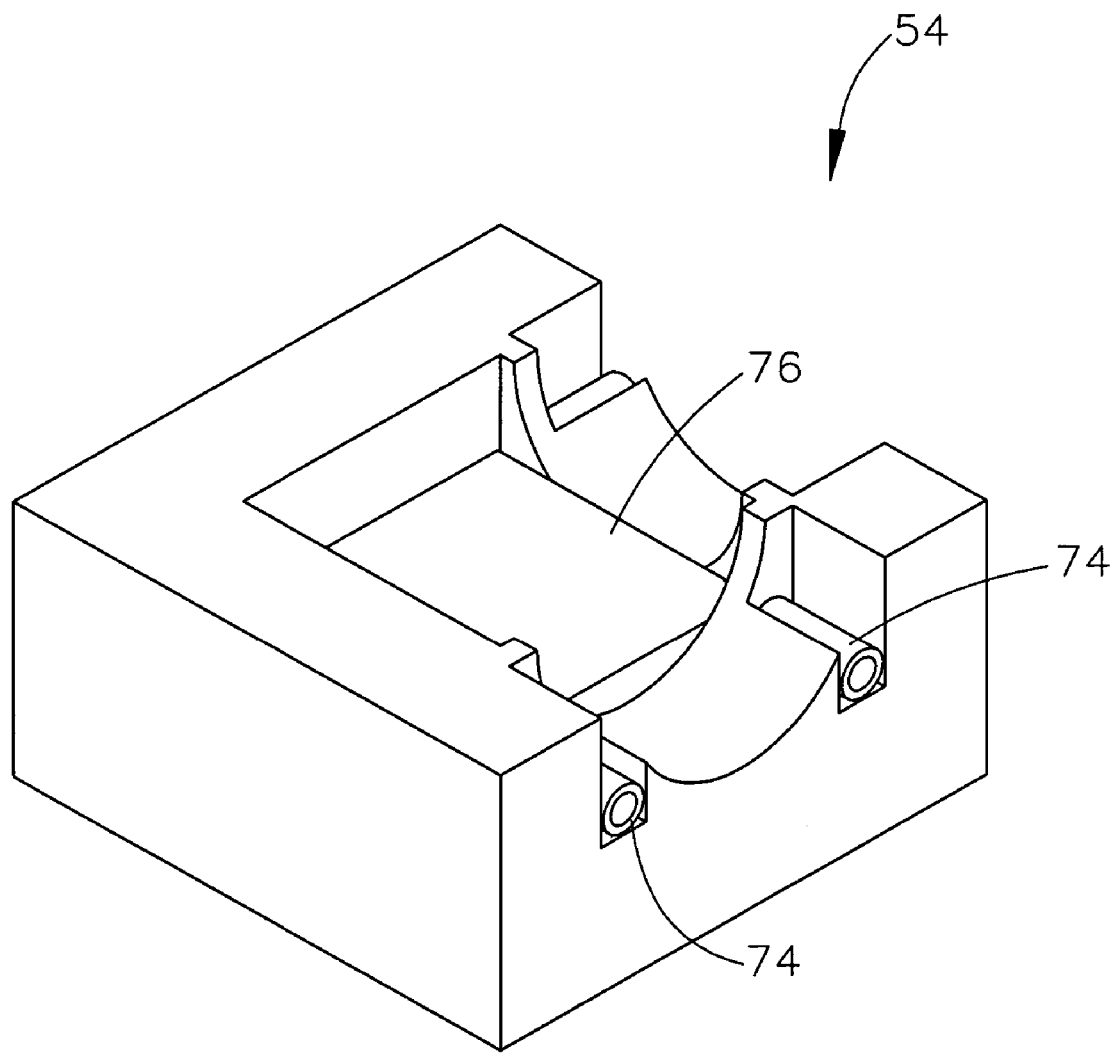
FIG. 11b is a perspective view of a connector in accordance with another embodiment constructed in accordance with the principles of the present invention.

In a second form as shown in FIG. 11b, the connector 54 comprises an insulative material with the electrical connector elements 74 as shown above and also comprises a pre-formed heat trace section 76 disposed within the body of the connector 54. The heat trace section 76 thus provides the requisite heat to the fitting 70 of the conduit system 10 and is constructed in accordance with the teachings of the present invention as described above.

Figure 11C:
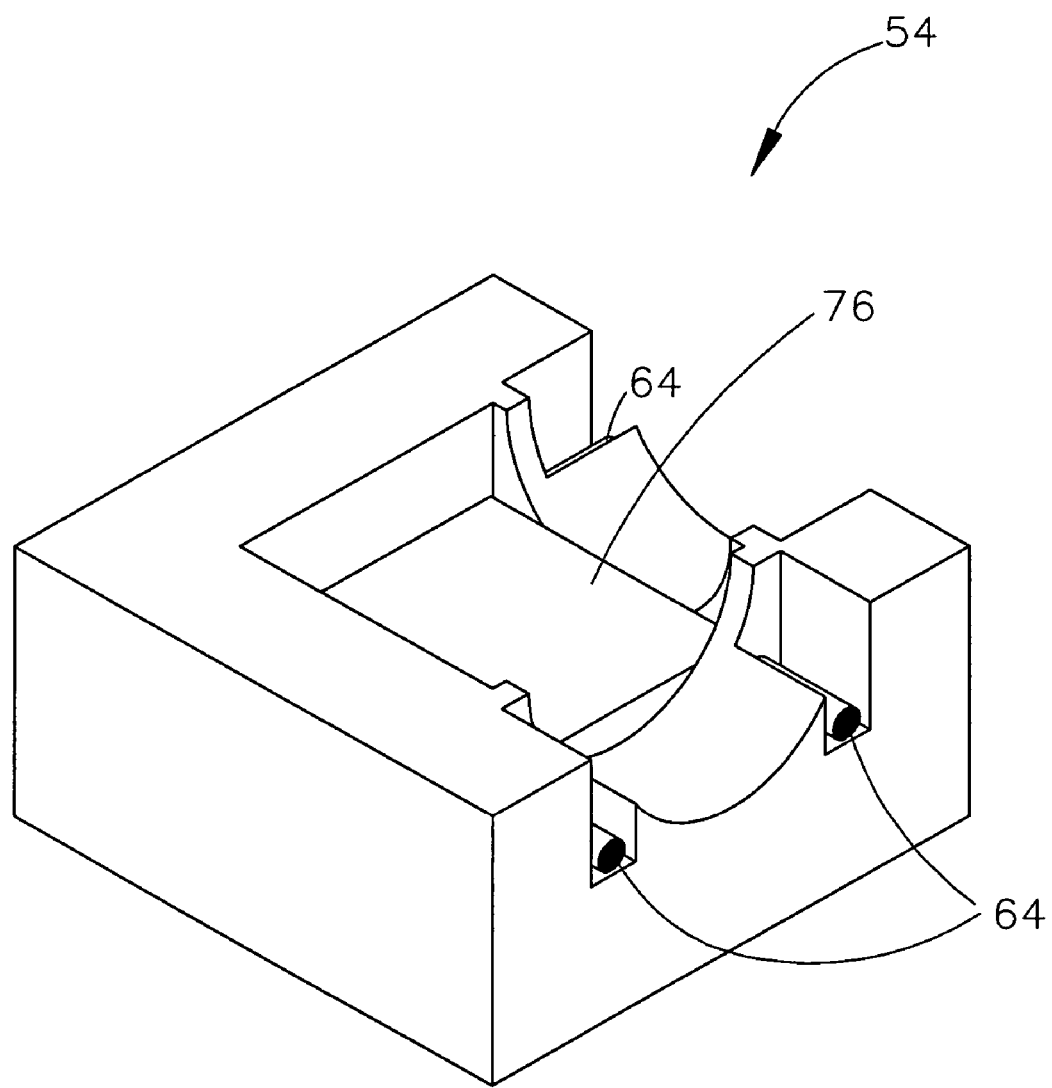
FIG. 11c is a perspective view of a connector in accordance with yet another embodiment constructed in accordance with the principles of the present invention.

In a third form as shown in FIG. 11c, the connector 54 comprises an insulative material with the pre-formed heat trace section 76 and not the electrical connector elements 74. In this form, the conductors 64 extend from the connector 54 as shown and are subsequently attached to another connector or terminal for electrical connection to a power source (not shown). Alternately, the connector 54, in each of the forms illustrated herein, may also include a discrete temperature sensor (not shown), or inherent temperature sensing capability using TCR (temperature coefficient of resistance) materials, for improved temperature control of the heater system.

In yet another form, a heat transfer compound such as a silicone or non-silicone based paste, or a sheet-type thermal gel, among others, is disposed on one side of the connector 54, on one or more of the exposed surfaces adjacent the conduit 13 for improved heat transfer. Accordingly, it should be understood that a variety of thermal interface materials may be employed both on the connector 54 and the heat trace section 52 to improve or control heat transfer while remaining within the scope of the present invention.

It should be noted that while a pin and groove configuration is used for connecting the heat trace section 52 to the connector 54, other features for connecting the same can be used as long as the connector 54 functions to secure the heat trace section 52 to an adjacent heat trace section 52 and to provide electrical continuity across the connection. For example, such features may include, by way of example, screws, pegs, snaps, clips, and the like to align and/or secure the mating structure. Additionally, features other than mechanical elements may be employed, such as electromagnetic features, while remaining within the scope of the present invention.

It should also be noted that while the heat trace section 52 is described in the first embodiment to have a curved portion 56, the heat trace section 52 is not limited to the shape and configuration as illustrated herein. The heat trace section 52 can be of any shape as long as it can be properly secured to the conduit 13 and thus provide heat to the conduit 13. For example, the heat trace section 52 may have a rectangular shape for receiving a rectangular conduit. Though it is preferred, it is not necessary to require that the heat trace section 52 be in direct contact with the conduit 13 as shown and described herein to achieve the purpose of heating the conduit 13. Moreover, multiple pieces of the heat trace section 52 may be employed around the circumference of the conduit 13 rather than a single piece as illustrated herein. Such variations should be understood to be within the teachings and scope of the present invention.

Figure 12:
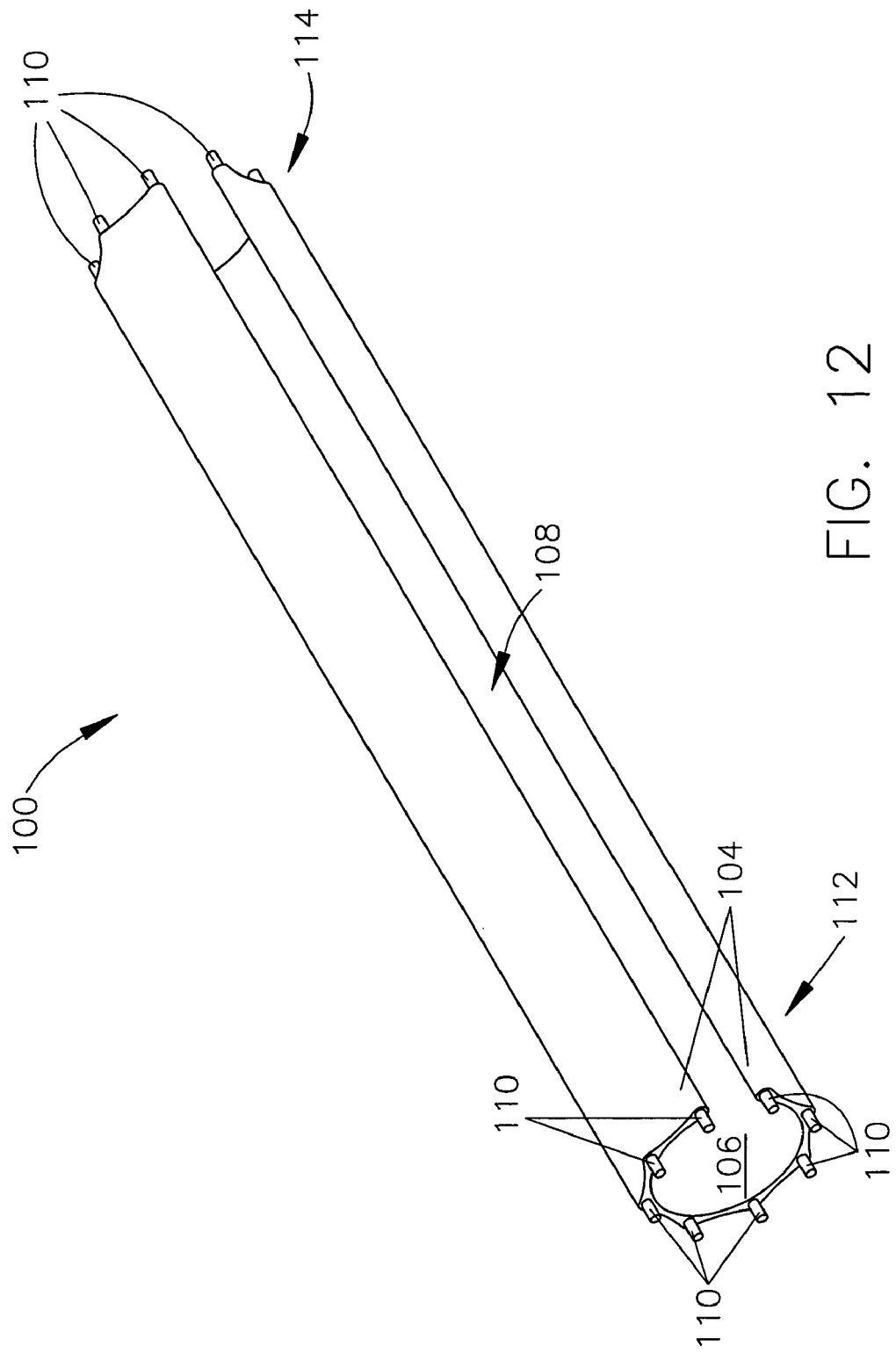
FIG. 12 is a perspective view of a heat trace section constructed in accordance with a second embodiment of the present invention.
Figure 13:
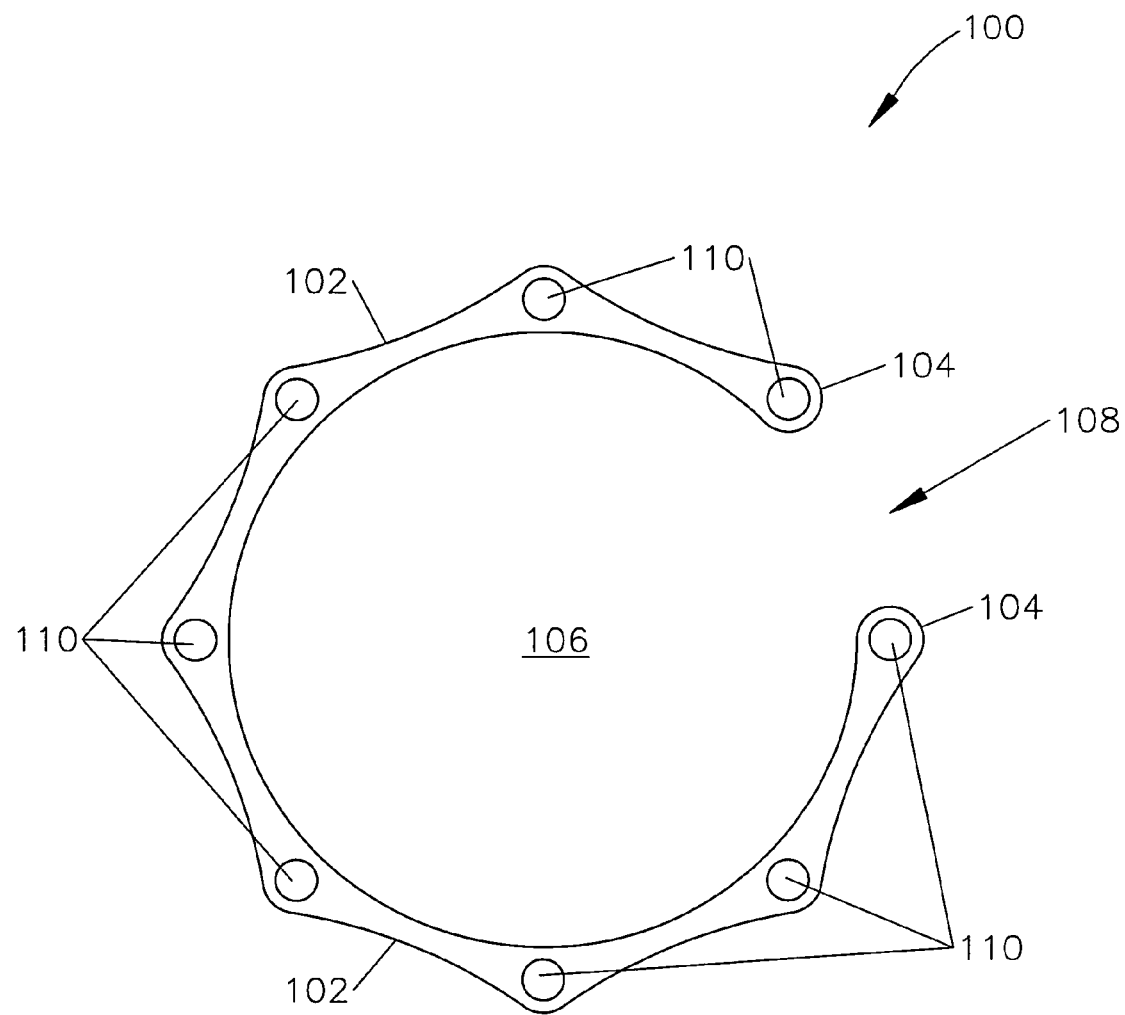
FIG. 13 is an end view of the heat trace section of FIG. 12 in accordance with the teachings of the present invention.

Referring to FIGS. 12 and 13, a heat trace section in accordance with a second embodiment of the present invention is generally indicated by reference numeral 100. The heat trace section 100 includes a plurality of conductors 110 in order to facilitate a larger size conduit 13 and to provide the requisite power to heat the conduit 13 and the fluids therein. The conductors 110 extend outwardly from the opposing ends 112 and 114 along the longitudinal axis of the heat trace section 100 for electrical connection to a power source (not shown) and/or to an adjacent heat trace section 100 or to a connector 54.

In the illustrative embodiment, seven panels 102 are shown to define a tubular channel 106 for receiving a conduit 13 therein. Two panels 102 are not joined along one of their longitudinal sides 104 to form a longitudinal slit 108 as shown. The longitudinal slit 108 facilitates the mounting of the heat trace section 100 onto the conduit 13. Since the heat trace section 100 is made of a flexible material, by deflecting the two panels 102 outwardly that define the longitudinal slit 108, the heat trace section 100 can be secured over the conduit 13, similar to the heat trace section 52 as previously described.

As previously stated, the heat trace section 100 of this embodiment is particularly suitable for a conduit having a larger size. The number of panels 102 thus depends on the size of the conduit 13 to be heated and is not limited to seven as shown in the illustrative embodiment of FIGS. 12 and 13. It should be understood that any number of conductors 110 and corresponding panels 102 may be employed according to the size and heating requirements of the conduit 13 while remaining within the scope of the present invention.

Figure 14:
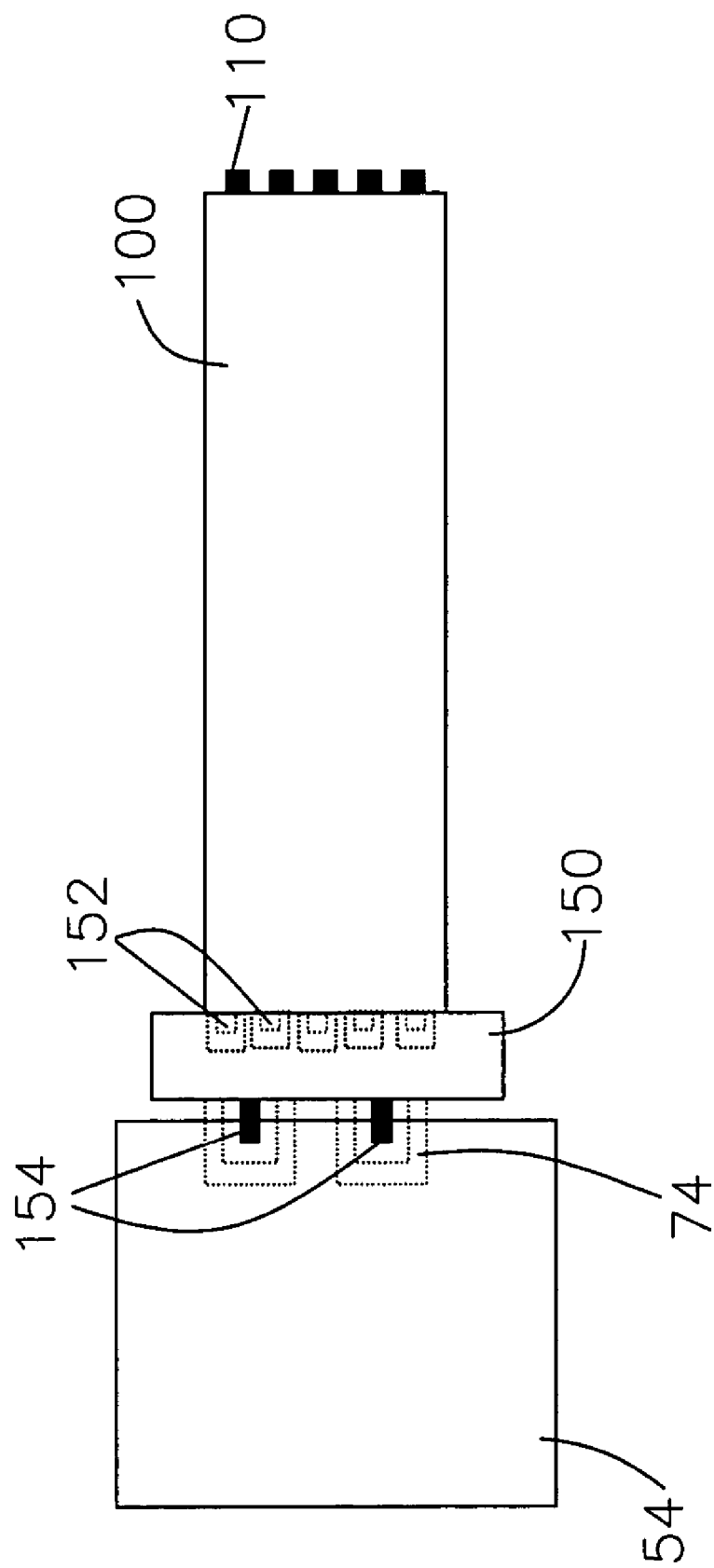
FIG. 14 is a top view of a bussing adapter constructed in accordance with the teachings of the present invention

Referring to FIG. 14, a bussing adapter that functions to adapt the multi-conductor embodiment of FIGS. 12 and 13 to a two-conductor connector 54 as previously shown is illustrated and generally indicated by reference numeral 150. As shown, the bussing adapter 150 is preferably in the form of a ring that is disposed between the heat trace section 100 and the connector 54. The bussing adapter 150 is preferably an insulative material and includes a plurality of electrical connector elements 152 (shown dashed) on one side, preferably in the form of sockets, to receive the plurality of conductors 110 of the heat trace section 100. On the opposite side, the bussing adapter 150 includes a pair of conductors 154 that extend from the body of the bussing adapter 150 to engage with the electrical connector elements 74 (shown dashed) of the connector 54. Inside the bussing adapter 150, the electrical connector elements 74 are bussed (not shown) to each of the conductors 154 to provide for electrical continuity.

Figure 15:
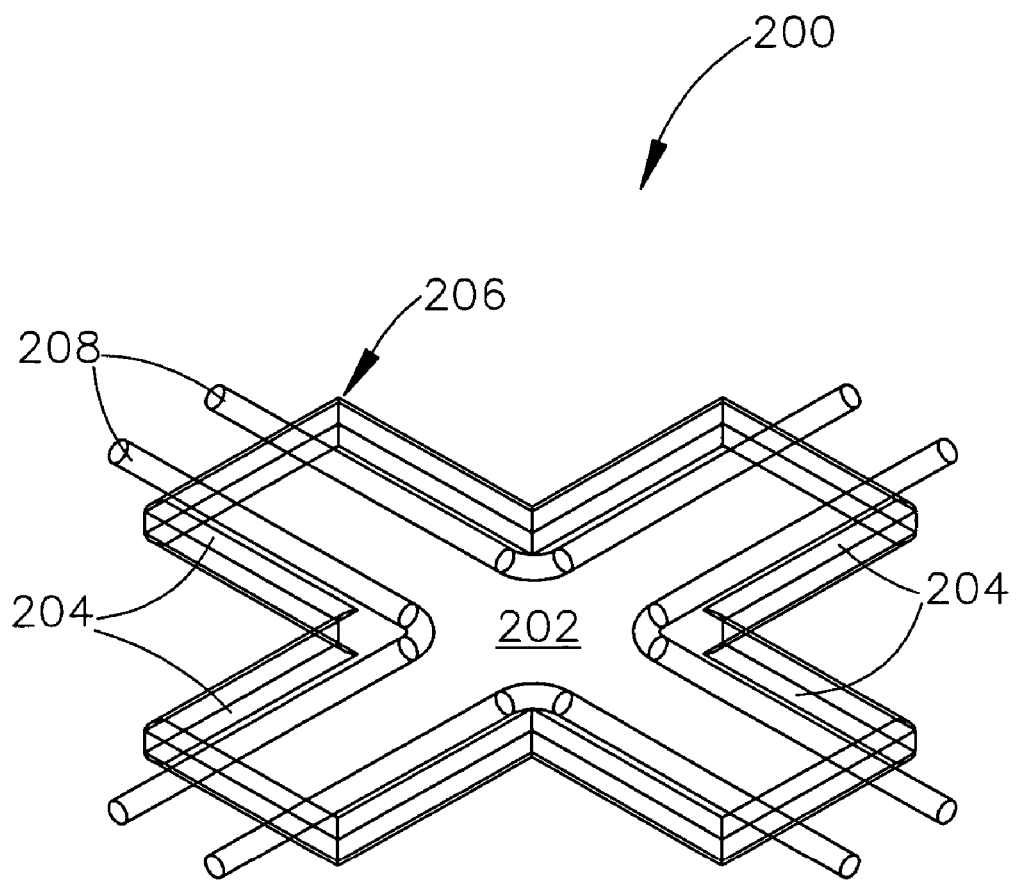
FIG. 15 is a perspective view of a heat trace junction constructed in accordance with a third embodiment of the present invention.
Figure 16:
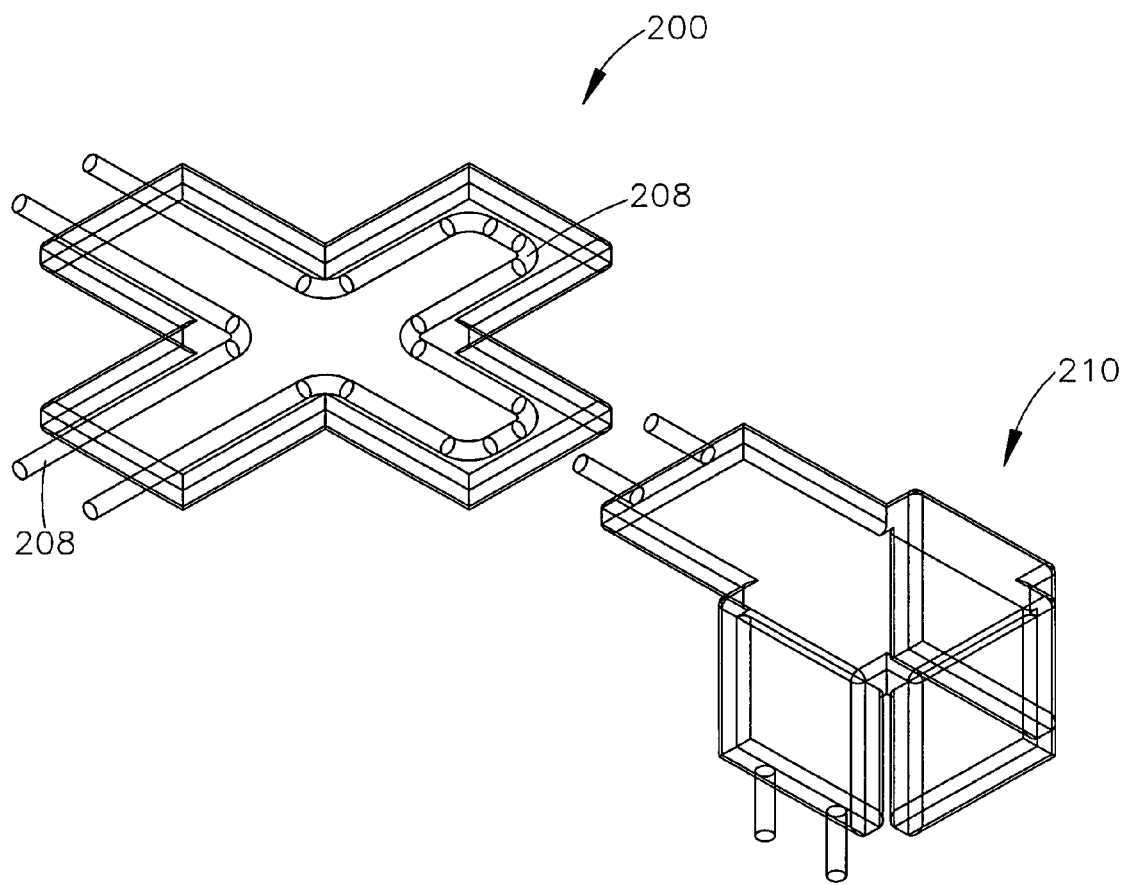
FIG. 16 is a perspective view of an alternate form of the heat trace junction of FIG. 15 configured for an elbow junction of a conduit system and constructed in accordance with the teachings of the present invention.
Figure 17:
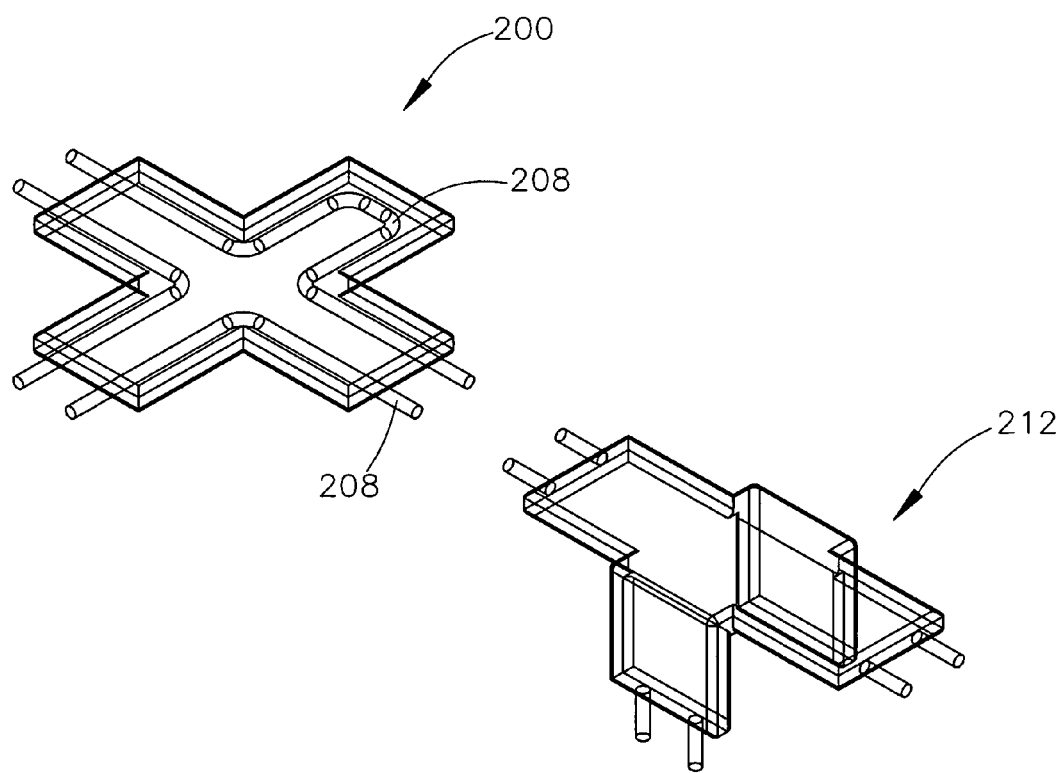
FIG. 17 is a perspective view of an alternate form of the heat trace junction of FIG. 15 configured for a T-junction of a conduit system and constructed in accordance with the teachings of the present invention.
Figure 18:
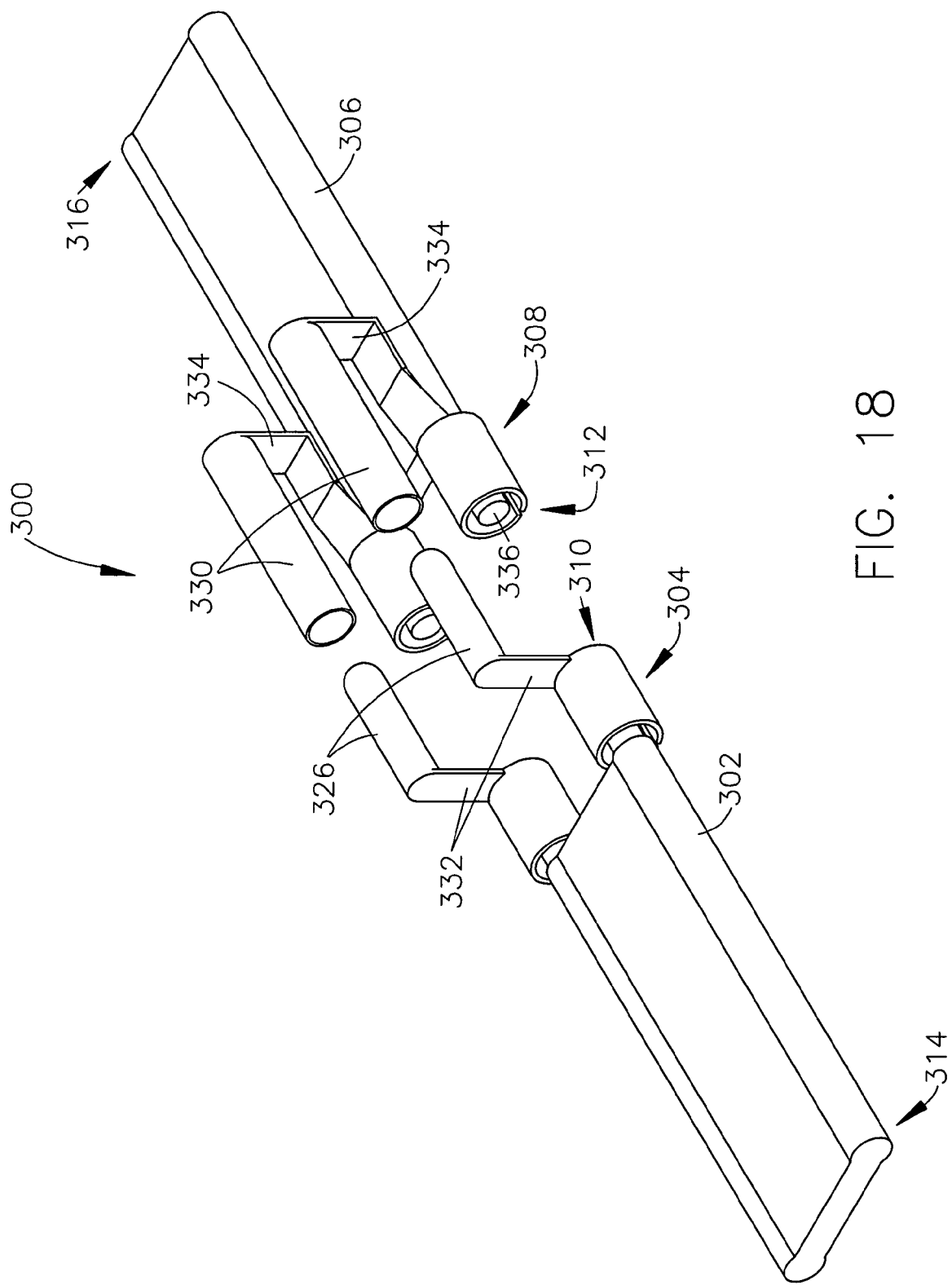
FIG. 18 is a perspective view of heat trace sections with termination structures in accordance with a fourth embodiment of the present invention, the heat trace sections being in a disengaged state.
Figure 19:
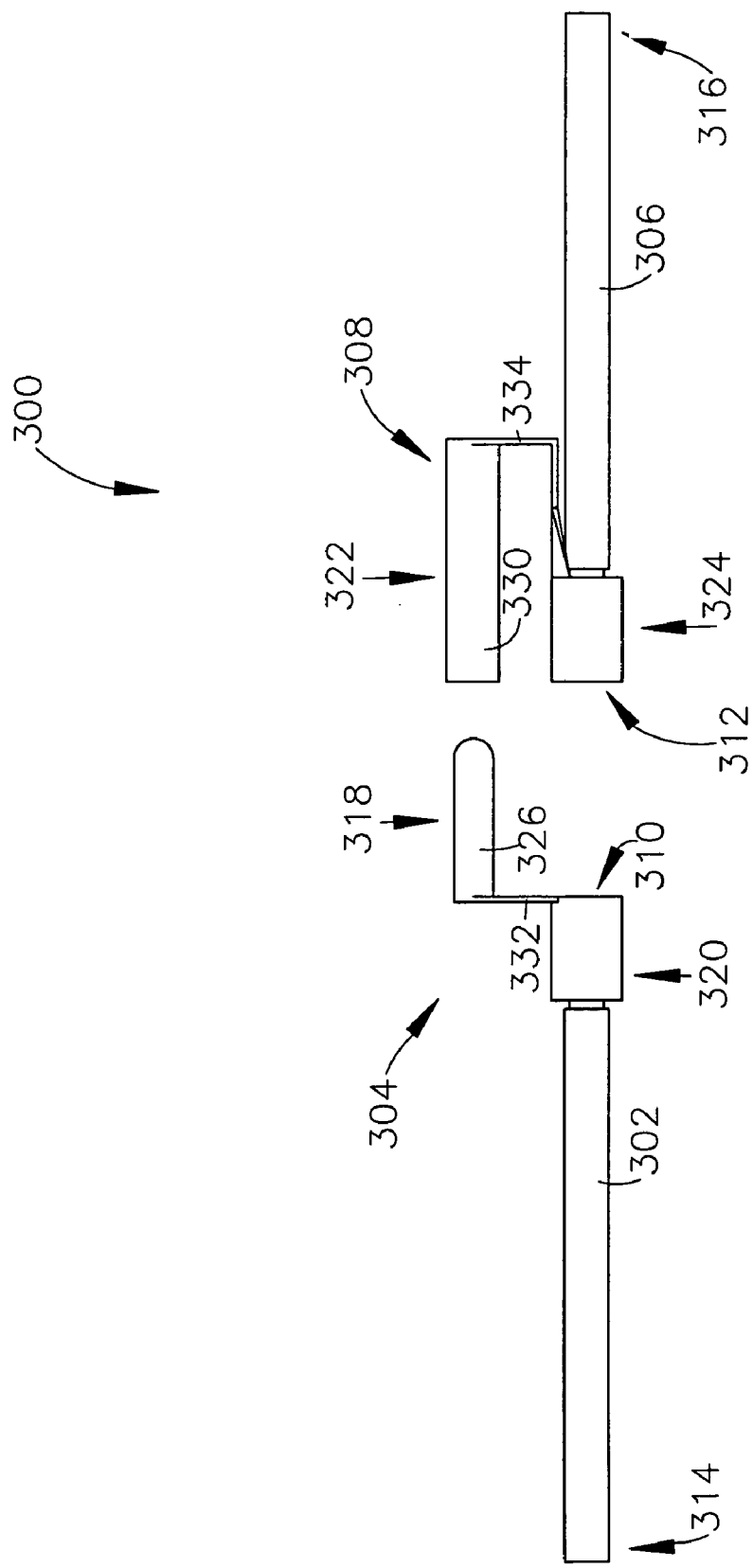
FIG. 19 is a side view of the heat trace sections of FIG. 18 in accordance with the teachings of the present invention.
Figure 20:
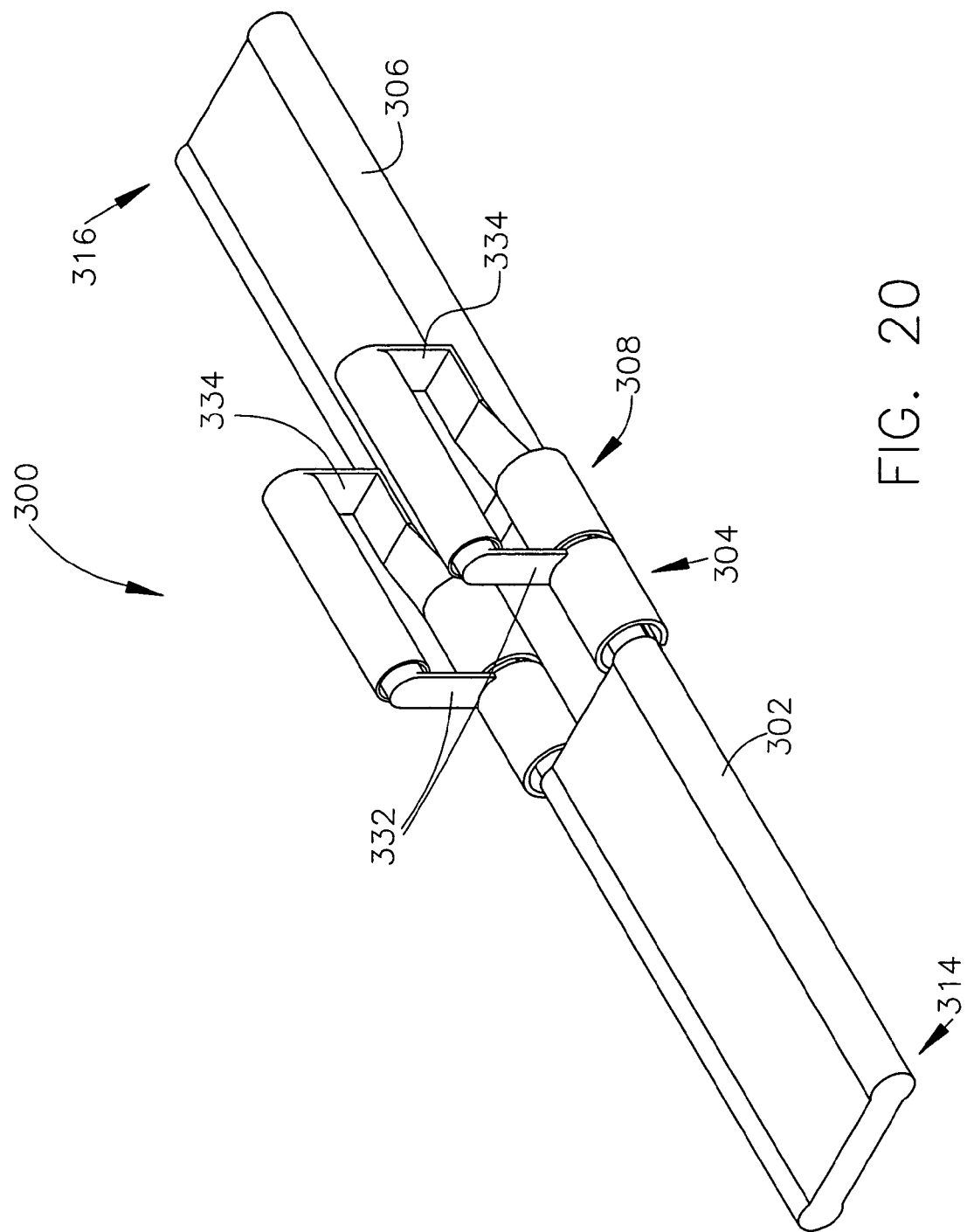
FIG. 20 is a perspective view of the heat trace sections of FIG. 18 in an engaged state in accordance with the teachings of the present invention.
Figure 21:
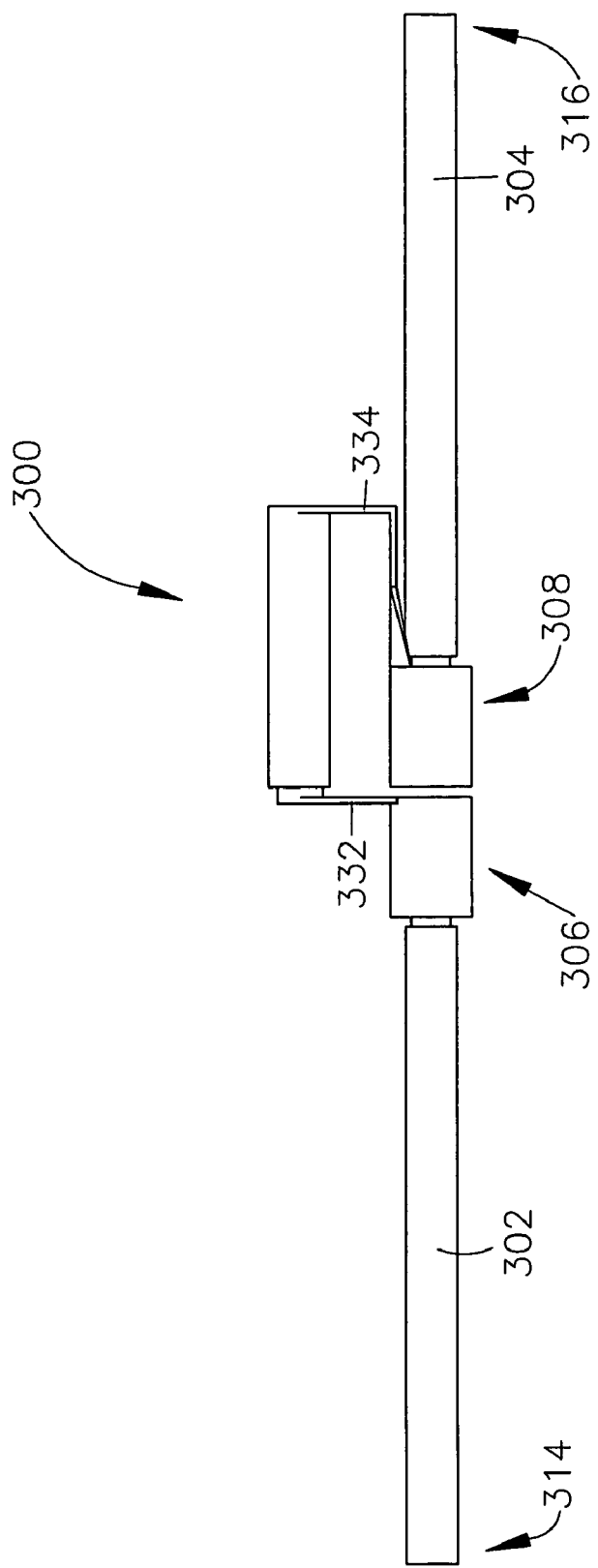
FIG. 21 is a side view of the heat trace sections of FIG. 20 in accordance with the teachings of the present invention.

Referring now to FIGS. 15 through 17, in accordance with a third embodiment of the present invention, a heat trace junction for use with intersections or joints of a conduit system 10 is provided and is generally indicated by reference numeral 200. As shown, the heat trace junction 200 preferably defines a cross configuration having a plurality of arms 204 extending from a base portion 202. Each of the arms 204 have an engaging end 206 provided with a pair of conductors 208 for connecting to an adjacent power source (not shown) or an adjacent heat trace section or junction. Although only two conductors 208 are shown at the engaging ends 206, it should be understood that a plurality of conductors, i.e. more than two, may be employed according to specific power requirements while remaining within the scope of the present invention. Additionally, the path of the conductors 208 may vary according to specific heating requirements, and it should be understood that paths other than those illustrated herein, e.g. traveling down one or two arms 204 rather than all four as shown, should be construed as falling within the teachings and the scope of the present invention.

The heat trace junction 200 can be formed into an appropriate shape to be properly mounted to a junction of the conduit system 10. For example, the heat trace junction 200 can be formed into an elbow shape 210 as shown in FIG. 16 for use with an elbow junction of the conduit system 10 (shown in FIG. 1). Alternately, the heat trace junction 200 can be formed into a T-shape 212 as shown in FIG. 17 for use with a T-junction (not shown) of the conduit system 10. As further shown, the conductors 208 may comprise a variety of configurations as shown in FIGS. 16 and 17, depending on the need for connecting the junctions to an adjacent heat trace section or to a connector.

Referring to FIGS. 18 through 21, a modular heat trace connector assembly in accordance with a fourth embodiment of the present invention is generally indicated by numeral 300. The modular heat trace connector assembly 300 comprises a first heat trace section 302, a first termination structure 304, a second heat trace section 306, and a second termination structure 308. Although the first heat trace section 302 and the second heat trace section 306 are shown in FIGS. 18 through 21 to define a relatively flat shape, it should be understood that the respective heat trace sections 302 and 306 can be of any geometrical shape such as the circular or cylindrical shape previously illustrated. Accordingly, the flat shape should not be construed as limiting the scope of the present invention.

The first heat trace section 302 and the second heat trace section 306 each have an abutting end 310 and 312 and a distal end 314 and 316. The termination structures 304 and 308 are provided at the abutting ends 310 and 312 and have mating features for being mechanically and electrically coupled together. More specifically, the first termination structure 304 has an upper engaging portion 318 and a lower engaging portion 320. The second termination structure 308 also has a corresponding upper engaging portion 322 and a corresponding lower engaging portion 324. The upper engaging portion 318 of the first termination structure 304 defines a pin configuration while the upper engaging portion 322 of the second termination structure 308 defines a socket configuration to facilitate the engagement between the upper engaging portions 318 and 322. In one preferred form, the upper engaging portion 318 of the first termination structure 304 includes a pair of pins 326. The upper engaging portion 322 of the second termination structure 308 includes a corresponding pair of sockets 330 for receiving the pins 326 therein, thus providing a mechanical and electrical connection. Preferably, the termination structures 304 and 308 are made of a nickel material, although other materials such as copper that provide sufficient electrical continuity may also be employed while remaining within the scope of the present invention.

As further shown, the lower engaging portion 320 of the first termination structure 304 includes a pair of extensions 332 from which the pins 326 of the upper engaging portion 318 extend upwardly. The lower engaging portion 324 of the second termination structure 308 also includes a pair of extensions 334 from which the engaging arms 328 of the upper engaging portion 322 extend. The extensions 322 and 334 each receive therein a conductor 336 of the heat traces 302 and 306 for electrical continuity.

Though not shown in the drawings, the distal ends 314 and 316 of the first heat trace section 302 and the second heat trace section 306 may optionally be provided with termination structures 304 or 308 to be connected to additional sections of heat traces or to a connector. Alternatively, the distal ends 314 and 316 may be provided with suitable engaging means (not shown in the drawings) for being connected to a power source (not shown).

Figure 22:
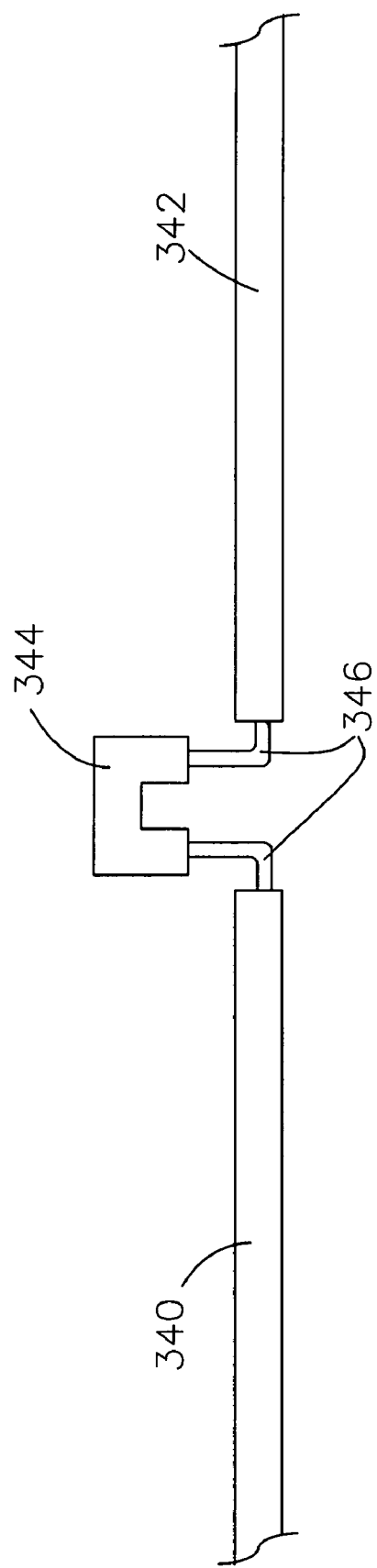
FIG. 22 is a side view of an alternate form of connecting the heat trace sections of FIGS. 18-21 and constructed in accordance with the teachings of the present invention.

Referring to FIG. 22, an alternate connector for connecting heat trace sections 340 and 342 is illustrated and generally indicated by reference numeral 344. The connector 344 generally defines a "U" configuration to connect the conductors 346 as shown. The flexible conductors 346 are turned upwards as shown in order to engage the connector 344, which defines receiving holes (not shown) in one form of the present invention. The connector 344 may be press-fit, bonded, or welded onto the conductors 346 in accordance with techniques as known in the art. Accordingly, the ends of heat trace section 340 and 342 having exposed conductors 346 are closer together than the previously illustrated embodiment, thus improving the uniformity of heat transfer along the heat trace sections.

The modular heat trace connector assembly 300 is thus configured to position the pin and socket connection area away from the hot surface of the heat trace sections 302 and 306 in order to reduce thermal fatigue of the pins and sockets in high temperature applications.

Although the above-described modular heater assembly 50 has been illustrated and detailed as having a construction similar to a conventional heat trace cable, it should be understood that other types of heater construction besides a heat trace cable construction may also be employed while remaining within the scope of the present invention. A heater type such as a polymer heater or a layered film heater, among others, that is modular and can easily be replaced and repaired in a conduit system using the modular connectors and other embodiments as described herein should be construed as being within the scope of the present invention.

Figure 23:
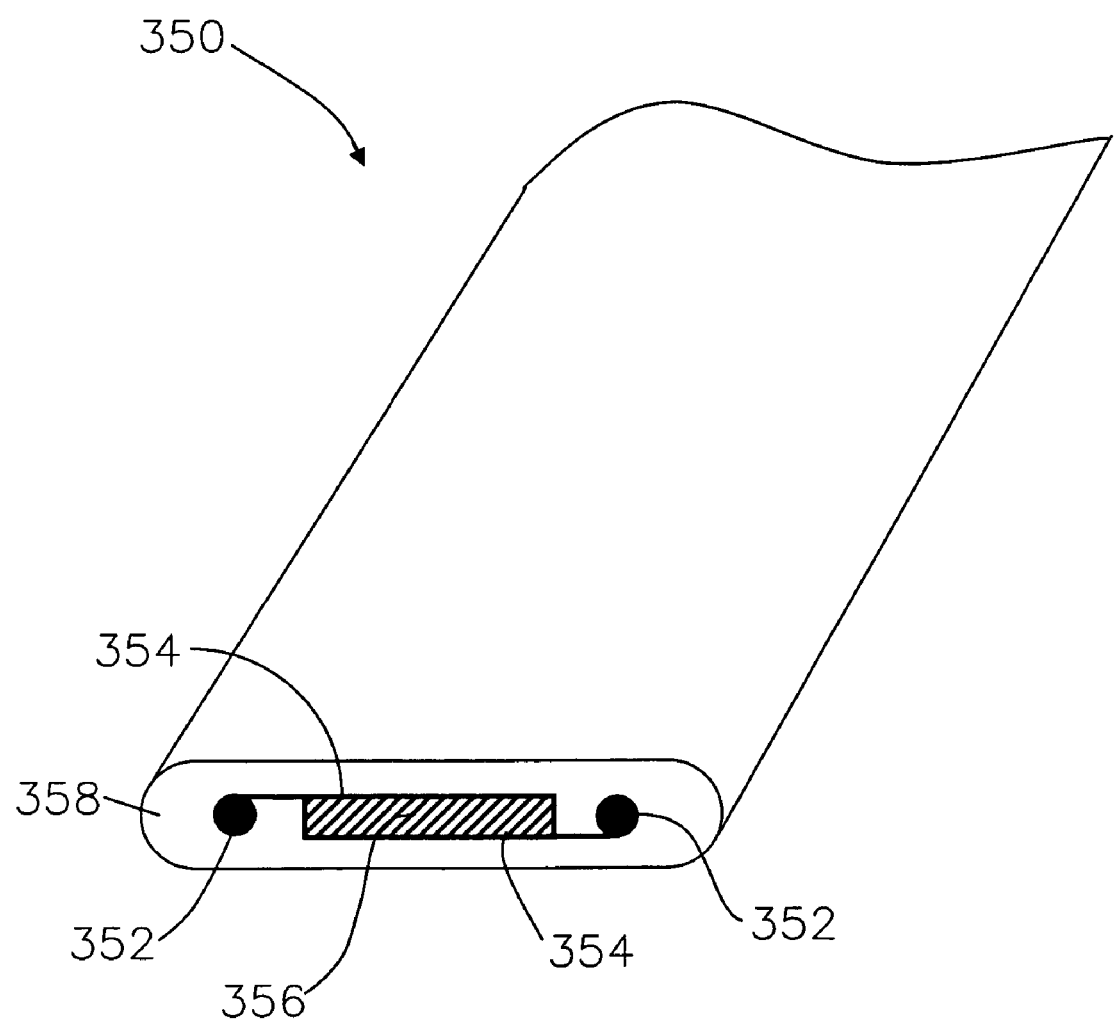
FIG. 23 is a perspective cutaway view of another embodiment of a heater construction, a z-directional heater, in accordance with the teachings of the present invention.

With reference to FIG. 23, an embodiment of a z-directional heater in accordance in the teachings of the present invention is illustrated and generally indicated by reference numeral 350. The z-directional heater 350 comprises a pair of conductors 352, each of which are electrically connected to foil elements 354. A conductive polymer material 356 is disposed between the foil elements 354 as shown, and an insulating material 358 surrounds the entire assembly. The z-directional heater 350 is adapted for a modular construction as previously described, and with the addition of the foil elements 354, the quality of the heat provided by the heater can be tailored to specific application requirements. It should be understood that the shape and configuration of the z-directional heater 350 is exemplary only and other shapes and additional elements, such as those described herein, e.g., tubular shape, a ground plane element, may also be employed while remaining within the scope of the present invention. Moreover, elements 354 are not limited to a foil material, and in alternate forms comprise a grid or screen material.

The z-directional heater 350 is preferably formed as a sheet of material with multiple conductors 352 and corresponding foil elements 354. As such, any size of z-directional heater 350 can be easily cut or removed from the sheet according to specific application requirements. For example, multiple sections of conductors 352 and foil elements 354, e.g. more than one set of each, can be removed across a width of the sheet, along with cutting the length of the conductors 352 and foil elements 354 to the desired dimension(s).

Figure 24:
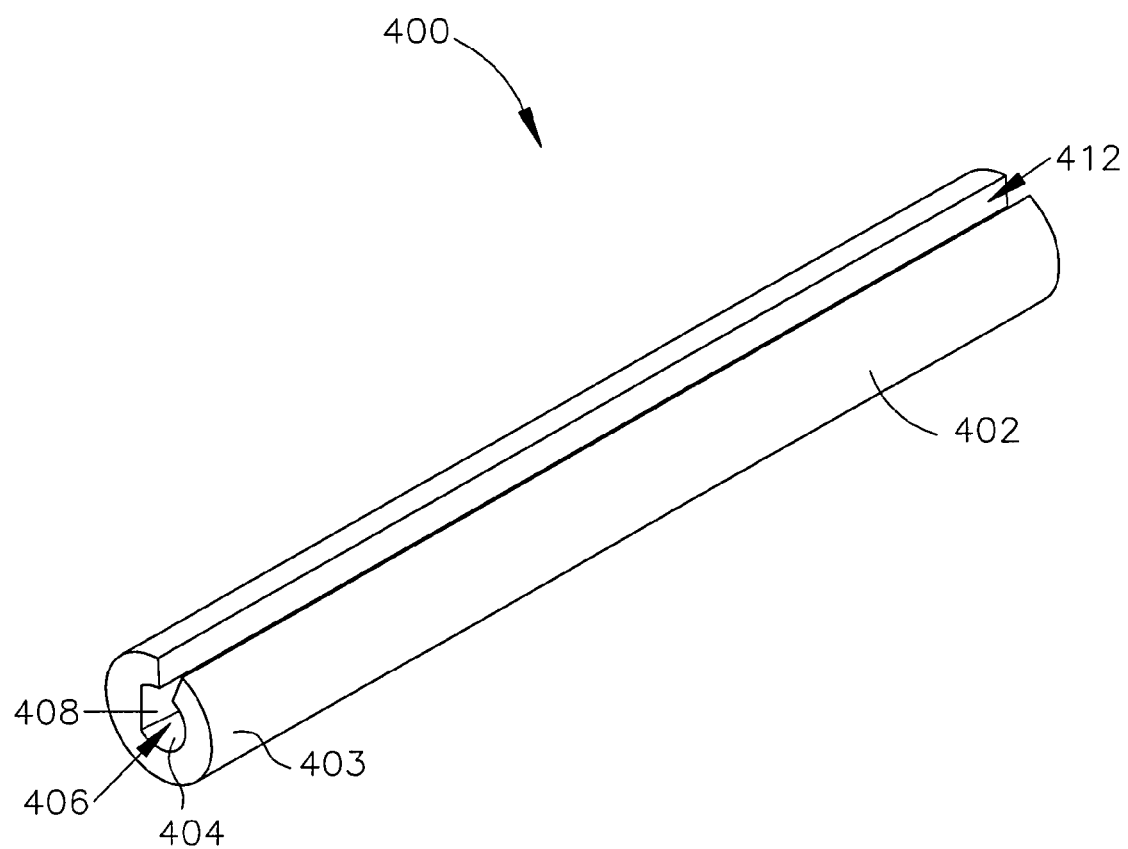
FIG. 24 is a perspective view of a thermal insulation jacket for a heated conduit constructed in accordance with the teachings of the present invention.
Figure 25:
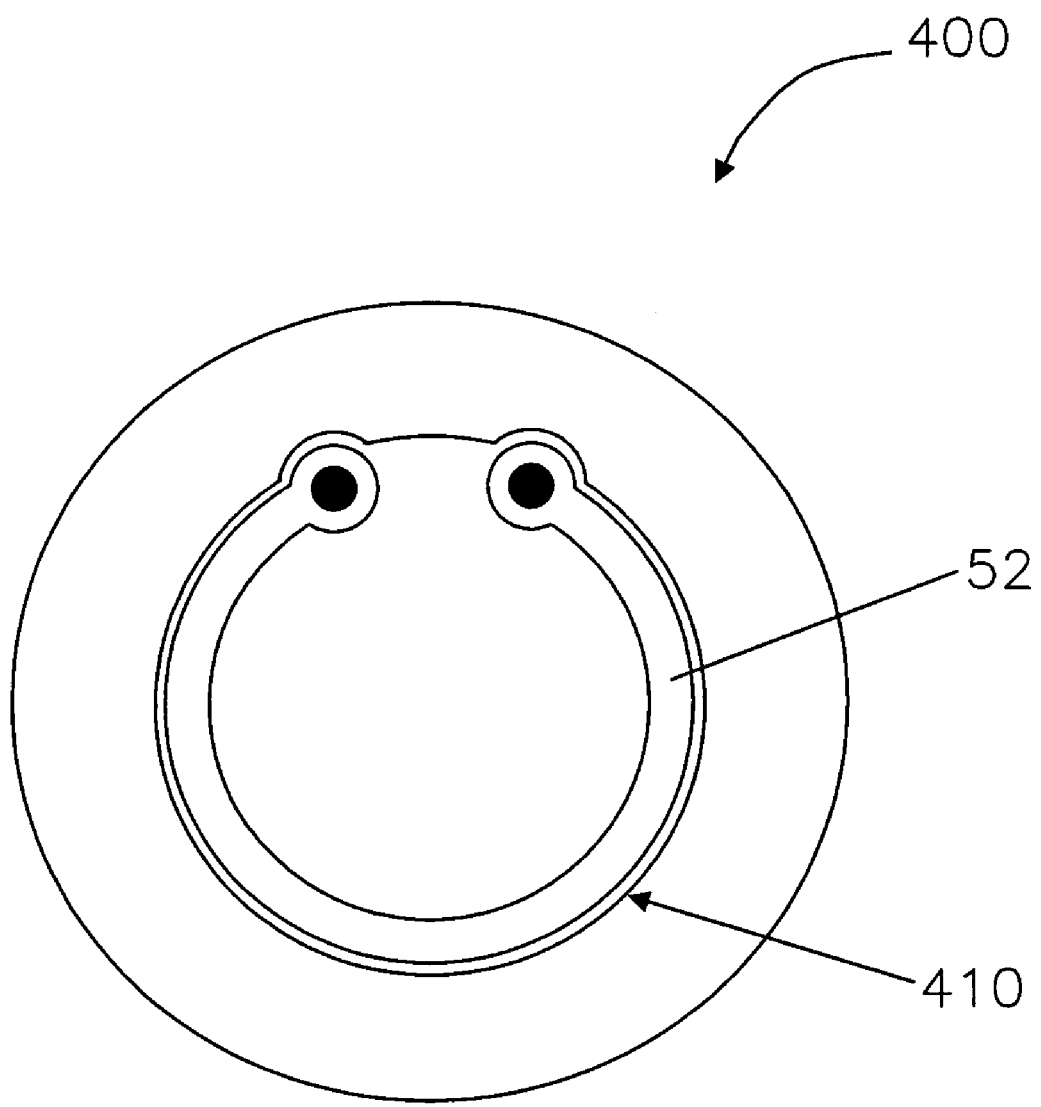
FIG. 25 is an end view of a thermal insulation jacket with an alternate pocket configuration and constructed in accordance with the teachings of the present invention.

Referring now to FIG. 24, a thermal insulation jacket for a heat-traced conduit, or a heated conduit (not shown), is generally indicated by reference numeral 400. The thermal insulation jacket 400 preferably defines a tubular insulation body 402, which has an outer wall 403 and an inner wall 404 defining a channel 406 for receiving a heated conduit, which may be a heat-traced conduit as previously described. The inner wall 404 defines a pocket 408 to house a conventional heat trace cable, as previously described, that is placed along the length of a conduit. Alternately, the pocket 408 may take any number of shapes, such as an arcuate pocket 410 as shown in FIG. 25, to accommodate the heat trace section 52 as shown and described herein. Accordingly, the shape of the pocket 408 is designed to mirror or conform to the shape of the heat trace section, whatever that shape might be. Additionally, the thermal insulation jacket 400 having pocket 408 can alternately be provided with a slit 412 so that the jacket 400 can be deformed and placed over a conduit rather than being slid along the length of the conduit. Moreover, the thermal insulation jacket 400 in the configurations as shown can serve to accurately position one or more heat trace sections against the conduit for the purpose of controlling the heat losses to atmosphere.

Figure 26:
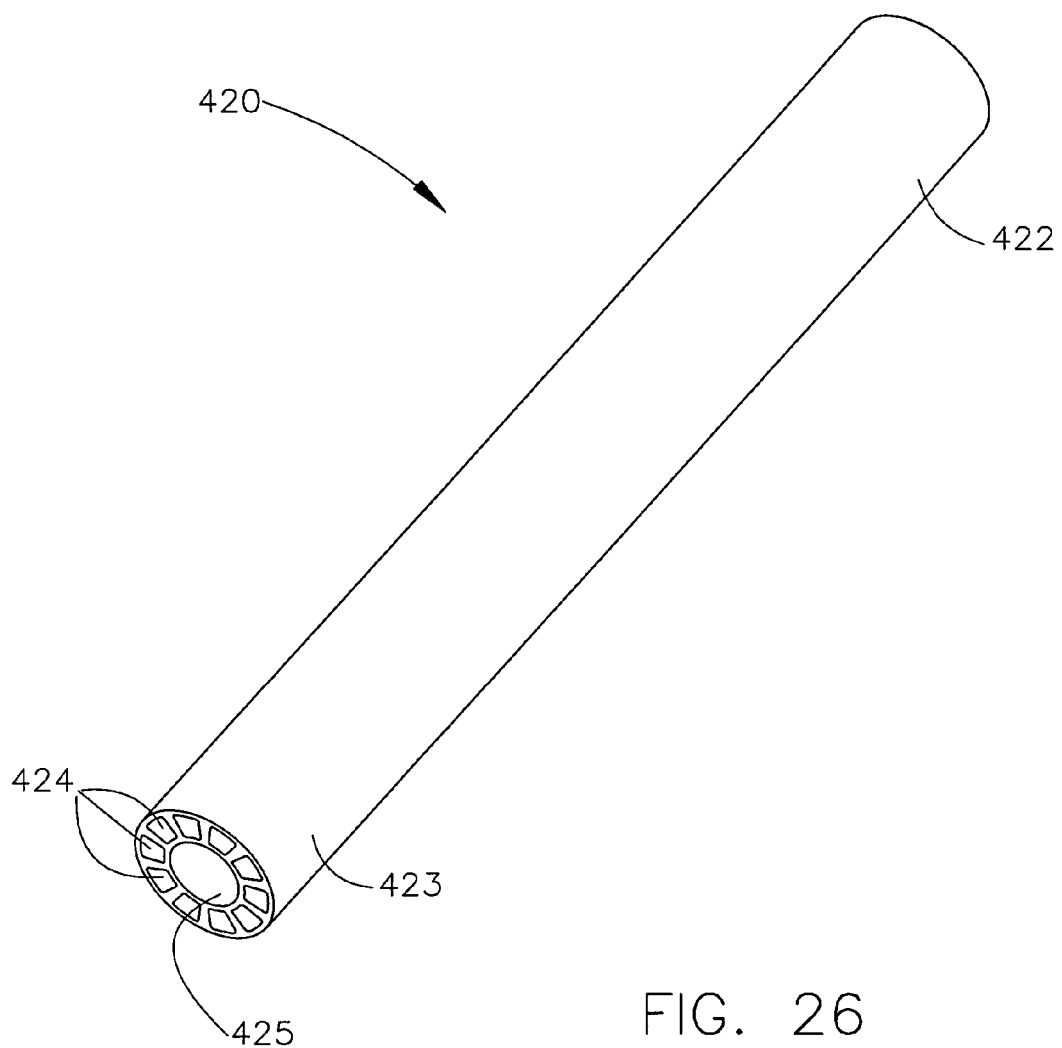
FIG. 26 is a perspective view of another form of a thermal insulation jacket for a heated conduit constructed in accordance with the teachings of the present invention.

Referring to FIG. 26, another form of a thermal insulation jacket for a heated conduit is generally indicated by reference numeral 420. The thermal insulation jacket 420 preferably defines a tubular insulation body 422 defining an outer wall 423 and an inner wall 425. The tubular insulation body 422 is formed with a plurality of air chambers 424 extending longitudinally between the outer wall 423 and the inner wall 425 as shown. The air chambers 424 thus provide an area to improve the uniformity of heat dissipation along the heat trace sections and to reduce heat losses through the thermal insulation jacket 420.

Figure 27:
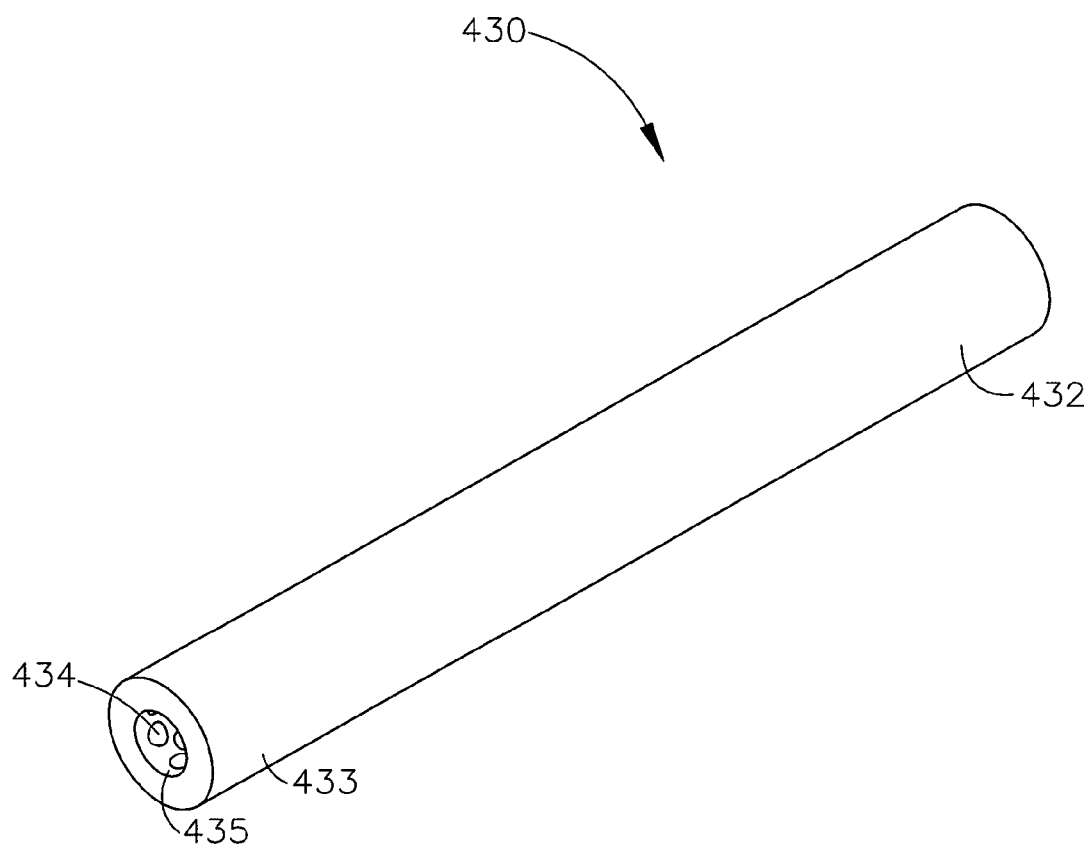
FIG. 27 is a perspective view of a still another form of a thermal insulation jacket for a heated conduit constructed in accordance with the teachings of the present invention.

Referring to FIG. 27, another form of a thermal insulation jacket for heated conduit and having air chambers is generally indicated by reference numeral 430. The thermal insulation jacket 430 preferably defines a tubular insulation body 432 having an outer wall 433 and an inner wall 435. As shown, the tubular insulation body 432 has a plurality of air pockets 434 formed into the inner wall 435 and arranged in a somewhat random configuration along the longitudinal direction of the tubular insulation body 432. Accordingly, the air pockets 434 reduce heat losses through the thermal insulation jacket 430.

Figure 28:
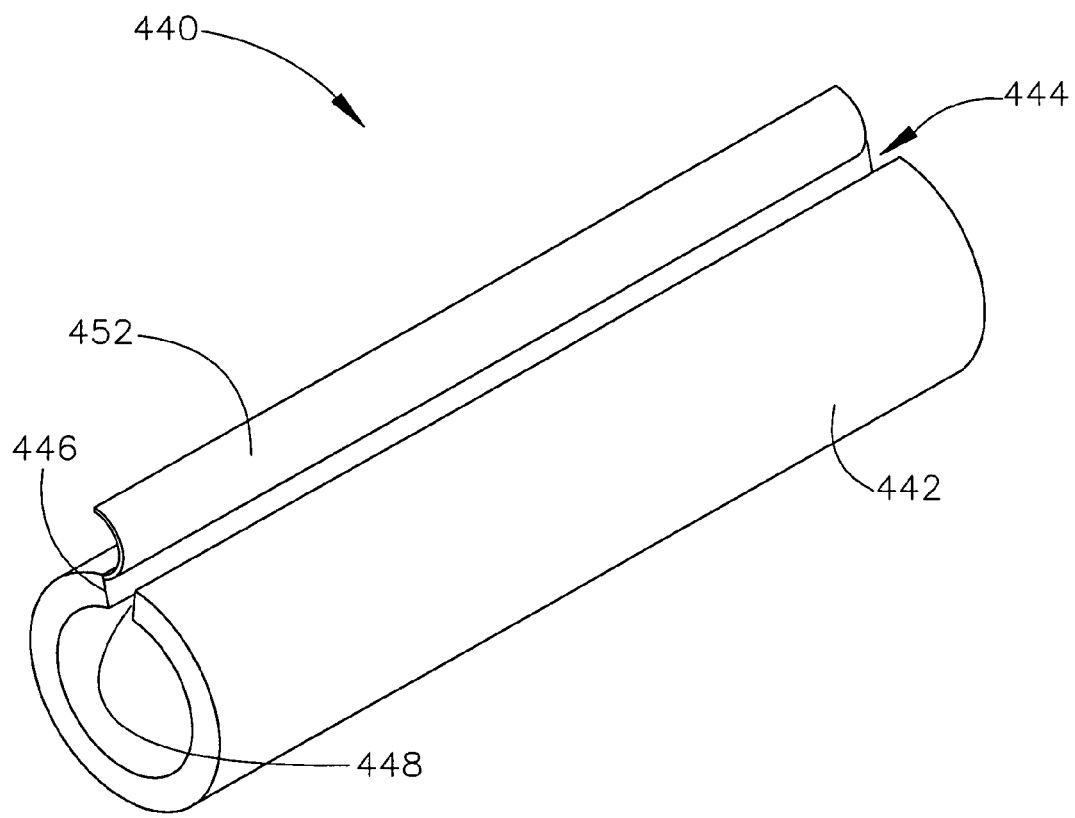
FIG. 28 is a perspective view of yet another form of a thermal insulation jacket for a heated conduit constructed in accordance with the teachings of the present invention.

Referring to FIG. 28, still another form of a thermal insulation jacket for a heated conduit is generally indicated by reference numeral 440. The thermal insulation jacket 440 defines a tubular insulation body 442, which has a longitudinal slit 444 defined by opposing longitudinal edges 446 and 448. The opposing longitudinal edges 446 and 448 are spaced apart in a circumferential direction and are properly spaced to allow for placement around a heated conduit. More specifically, the tubular insulation body 442 is made of a flexible material, e.g., silicone rubber sheet or foam, neoprene, polyimide foam or tape, among many others, such that the longitudinal edges 446 and 448 are deflected outwardly and are then biased against the heated conduit.

As further shown, one of the longitudinal edges 446 is provided with a flap 452 for properly engaging the other one of the longitudinal edges 446 after the thermal insulation jacket 440 is placed around the heated conduit. Using the flap 452 to close the longitudinal slit 444 helps to reduce heat loss to the outside environment. Preferably, the flap 452 is also made of a thermal insulation material to provide thermal insulation. The flap 452 may be made of an adhesive tape, or provided with an adhesive coating, or alternately may be Velcro® or a flap that includes mechanical snaps, among other securing techniques, such that the flap 452 is secured to the other one of the longitudinal edges 448 and along an outer surface of the tubular insulation body 442.

In each of the thermal insulation jacket embodiments as described herein, it is preferable that the jackets are extruded. Additionally, it should be understood that any of the features, e.g., air chambers, pockets sized to the heat trace section geometry, longitudinal slit, and flap, may be provided alone or in combination with each other while remaining within the scope of the present invention. Moreover, multiple pockets may be provided to facilitate multiple heat trace sections 52 while not departing from the spirit and scope of the present invention.

The description of the invention is merely exemplary in nature and, thus, variations that do not depart from the gist of the invention are intended to be within the scope of the invention. For example, the conductive polymer material used for the heat trace sections may be a semi-conductive material in order to self-regulate temperature or a non-semi-conductive material such that temperature is not regulated through the material but rather through a control system. Additionally, the thermal insulation jackets may be fitted with an external shell, e.g. rigid plastic, of any shape or geometry, in order to protect the thermal insulation jackets from damage from the outside environment. Such variations are not to be regarded as a departure from the spirit and scope of the invention.

What is claimed is:

1. A heat trace assembly for heating a conduit system comprising:
   at least one preformed heat trace section adapted to be placed around at least a portion of the conduit; the preformed heat trace section comprising:
      a pair of bus-conductors;
      a semiconductive polymer material surrounding the bus-conductors and functioning as a heating element;
      a dielectric material surrounding the semiconductive polymer material; and
      an outer insulating jacket surrounding the dielectric material; and
   a connector secured to the heat trace section and adapted for coupling the heat trace section to an adjacent heat trace section,
   wherein the heat trace section and the connector can be quickly installed to and removed from the conduit system.

2. The heat trace assembly according to claim 1, further comprising a plurality of preformed heat trace sections and a corresponding plurality of connectors.

3. The heat trace assembly according to claim 1, wherein the heat trace section defines an elongated body having a channel for receiving a conduit of the conduit system therein.

4. The heat trace assembly according to claim 3, wherein the heat trace section further comprises a pair of locking edges extending along a longitudinal axis of the heat trace section for securing the heat trace section to the conduit.

5. The heat trace assembly according to claim 1, wherein the heat trace section further comprises at least two conductors for the application of electrical power.

6. The heat trace assembly according to claim 1, wherein the heat trace section further comprises more than two conductors for conduits having a larger size.

7. The heat trace assembly according to claim 6 further comprising a bussing adapter disposed between the heat trace section and the connector to bus the more than two conductors to the connector.

8. The heat trace assembly according to claim 1, wherein the connector defines a shape that conforms to a fitting of the conduit system.

9. The heat trace assembly according to claim 1, wherein the connector comprises an insulative material and further comprises electrical connector members for connection to the heat trace section.

10. The heat trace assembly according to claim 9, wherein the electrical connector members are selected from a group consisting of squeeze connectors, crimped socket connectors, and interference fit socket connectors.

11. The heat trace assembly according to claim 1, wherein the connector comprises an insulative material and further comprises electrical connector members for connection to the heat trace section and a pre-formed heat trace section formed within the connector.

12. The heat trace assembly according to claim 1, wherein the connector comprises an insulative material and further comprises a pre-formed heat trace section formed within the connector.

13. The heat trace assembly according to claim 1, wherein the connector further comprises a heat transfer compound applied to at least one surface of the connector adjacent a conduit system.

14. The heat trace assembly according to claim 1, wherein the connector further comprises a temperature sensor.

15. The heat trace assembly according to claim 1, wherein the heat trace section further comprises a heat transfer compound applied to at least one surface of the heat trace section adjacent a conduit system.

16. A modular heater assembly for heating a conduit system comprising:
   at least one preformed heater section adapted to be placed around at least a portion of the conduit; the preformed heater section comprising:
      a pair of bus-conductors;
      a semiconductive polymer material surrounding the bus-conductorsand functioning as a heating element;
      a dielectric material surrounding the semiconductive polymer material; and
      an outer insulating jacket surrounding the dielectric material; and
   a preformed connector secured to the heater section and adapted for coupling the heater section to an adjacent heater section,
   wherein the heater section and the connector can be quickly installed to and removed from the conduit system.

17. A heat trace assembly for heating a conduit system comprising:
   at least one preformed heat trace section adapted to be placed around at least a portion of the conduit;
   a connector secured to the heat trace section and adapted for coupling the heat trace section to an adjacent heat trace section; and
   a thermal insulation jacket disposed around the preformed heat trace section, the thermal insulation jacket comprising a body defining an outer wall and an inner wall, the body comprising a pocket disposed along the inner wall to accommodate a shape of a heat trace section,
   wherein the heat trace section and the connector can be quickly installed to and removed from the conduit system.

18. A heat trace assembly for heating a conduit system comprising:
   at least one preformed heat trace section adapted to be placed around at least a portion of the conduit;
   a connector secured to the heat trace section and adapted for coupling the heat trace section to an adjacent heat trace section; and a thermal insulation jacket disposed around the preformed heat trace section, wherein the heat trace section and the connector can be quickly installed to and removed from the conduit system.

19. A heat trace assembly for heating a conduit system comprising:

a plurality of preformed heat trace sections adapted to be placed around portions of the conduit system;

a corresponding plurality of connectors secured to the preformed heat trace sections and adapted for coupling the preformed heat trace sections to adjacent preformed heat trace sections; and a thermal insulation jacket disposed around the preformed heat trace sections, wherein the heat trace sections and the connectors can be quickly installed to and removed from the conduit system.

20. A heat trace assembly for heating a conduit system comprising:

a plurality of preformed heat trace sections adapted to be placed around portions of the conduit system; and a corresponding plurality of connectors secured to the preformed heat trace sections and adapted for coupling the preformed heat trace sections to adjacent preformed heat trace sections;

wherein the heat trace sections and the connectors can be quickly installed to and removed from the conduit system.

21. A heat trace assembly for heating a conduit system comprising:

at least one preformed heat trace section adapted to be placed around at least a portion of the conduit, wherein the heat trace section can be quickly installed to and removed from the conduit system.

* * * * *